US008887918B2

(12) United States Patent
Parsons

(10) Patent No.: US 8,887,918 B2
(45) Date of Patent: *Nov. 18, 2014

(54) FOOD TRAY

(75) Inventor: Steven M. Parsons, St. Albert (CA)

(73) Assignee: ConAgra Foods RDM, Inc., Omaha, NE (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/424,520

(22) Filed: Jun. 15, 2006

(65) Prior Publication Data

US 2007/0116807 A1     May 24, 2007

(30) Foreign Application Priority Data

Nov. 21, 2005   (CA) .................................... 2527770

(51) Int. Cl.
*A45C 11/20*     (2006.01)
*B65D 77/04*     (2006.01)
*A23L 1/01*      (2006.01)
*A23L 1/48*      (2006.01)
*B65D 81/32*     (2006.01)

(52) U.S. Cl.
CPC .......... *B65D 81/3216* (2013.01); *B65D 77/046* (2013.01); *A23L 1/0128* (2013.01); *A23V 2002/00* (2013.01); *A23L 1/48* (2013.01); *B65D 2581/3404* (2013.01); *B65D 2581/3432* (2013.01)
USPC .......................................... 206/546; 206/550

(58) Field of Classification Search
USPC ......... 206/497, 518, 519, 520, 438, 490, 485, 206/511, 512, 216, 541, 223, 546, 548, 549, 206/499, 501–509, 514–517, 821, 550, 206/471; 220/23.83, 521, 23.86, 23.88, 220/23.87, 23.89, 495.03, 495.04, 573.5, 220/913, 592.23, 4.26, 4.27, 23.6, 574.2, 220/23.8, 6, 368, 608; 426/113, 119–120, 426/118
See application file for complete search history.

(56) References Cited

U.S. PATENT DOCUMENTS

| 113,893 A | 4/1871 | Joyce et al. .................... 220/762 |
| 166,102 A | 7/1875 | Hennaman ..................... 220/525 |

(Continued)

FOREIGN PATENT DOCUMENTS

| CH | 672 585       | 12/1989 |
| DE | 28 10 175 A1  | 9/1979  |

(Continued)

OTHER PUBLICATIONS

"Cafe Steamers," HealthyChoice.com, <http://www.healthychoice.com/products/meals/cafe_steamers.jsp> [retrieved Aug. 2007].

(Continued)

*Primary Examiner* — Jacob K Ackun
*Assistant Examiner* — Jenine Pagan
(74) *Attorney, Agent, or Firm* — Ryan T. Grace; Advent, LLP

(57) ABSTRACT

A food tray has a lower tray containing a first food product and an upper tray nested stably at least partly inside the lower tray, with the upper tray containing a second food product. An air permeable interface is provided between the upper tray and lower tray to allow venting of steam from the lower tray during cooking. A cover is provided for the food tray. Each of the lower tray and the upper tray are formed of a material that is suitable for use in a microwave or conventional oven. Various constructions may be used to create the air permeable interface, such as lugs, ledges and lips. The upper tray may sit above the lower tray. The trays are nested loosely for case of removal of the upper tray from the lower tray. Various configurations of cover may be used such as a sleeve, carton or lid. The upper tray may contain the higher value food product.

7 Claims, 10 Drawing Sheets

(56) References Cited

U.S. PATENT DOCUMENTS

| | | | |
|---|---|---|---|
| 177,593 A | 5/1876 | Skelline | |
| 181,823 A | 9/1876 | Cornwall | 99/425 |
| 241,254 A | 5/1881 | Udell | |
| 254,770 A | 3/1882 | Hurd | 99/450 |
| 472,002 A | 3/1892 | Ross | |
| 541,397 A | 6/1895 | Swartout | 220/573.5 |
| 590,212 A | 9/1897 | Daesch | 99/416 |
| 637,838 A | 11/1899 | Vernon | |
| 851,983 A | 4/1907 | Entringer | 210/314 |
| 899,244 A | 9/1908 | Chase | 99/412 |
| 902,181 A | 10/1908 | Tidow | 99/408 |
| 948,198 A | 2/1910 | Wiegand | 99/417 |
| 952,572 A | 3/1910 | Meyer | 99/413 |
| 955,033 A | 4/1910 | Wing | 99/428 |
| 1,004,423 A | 9/1911 | Hanlon | 220/759 |
| 1,099,603 A | 6/1914 | Ingersoll | |
| 1,263,004 A | 4/1918 | Tollagsen | 126/369 |
| 1,341,960 A | 6/1920 | Meyer et al. | 220/592.23 |
| 1,347,428 A | 7/1920 | Wittekind | 220/573.4 |
| 1,476,910 A | 12/1923 | Naugle | |
| 1,519,510 A | 12/1924 | Santarsiero | 99/416 |
| 1,630,787 A | 5/1927 | Cullen | 99/416 |
| 1,765,862 A | 6/1930 | Clapp | |
| 1,864,081 A | 6/1932 | Marr | |
| 1,906,592 A | 5/1933 | Hiester | |
| 1,944,089 A | 1/1934 | Litchfield | 150/9 |
| 1,985,978 A | 5/1934 | Thomas | 426/113 |
| 2,021,465 A | 11/1935 | Ritscher | 99/403 |
| 2,039,374 A | 5/1936 | Young | |
| 2,041,227 A | 5/1936 | Chalmers | 229/87 |
| 2,107,480 A | 1/1938 | Holton | 126/377.1 |
| 2,149,872 A | 3/1939 | Schmidt | 229/58 |
| 2,200,977 A | 5/1940 | Baxter | 426/95 |
| 2,271,921 A | 2/1942 | Luker | |
| 2,290,396 A | 7/1942 | Webster | |
| 2,540,036 A | 1/1951 | Spencer | |
| 2,556,115 A | 6/1951 | Smith | 99/417 |
| 2,559,101 A | 7/1951 | Wool | |
| 2,576,862 A | 11/1951 | Smith et al. | |
| 2,591,578 A | 4/1952 | McNealy et al. | |
| 2,600,566 A | 6/1952 | Moffett | |
| 2,650,485 A | 9/1953 | La Greca | 220/23.83 |
| 2,660,529 A | 11/1953 | Bloom | |
| 2,667,422 A * | 1/1954 | Kauffman | 426/86 |
| 2,673,805 A | 3/1954 | Colman | 99/171 |
| 2,673,806 A | 3/1954 | Colman | 99/171 |
| 2,714,070 A | 7/1955 | Welch | |
| 2,741,559 A | 4/1956 | Banowitz | 99/171 |
| 2,777,769 A | 1/1957 | Hodges | 426/113 |
| 2,801,930 A | 8/1957 | Paulucci | 99/171 |
| 2,805,392 A | 9/1957 | Schhnoll | 324/706 |
| 2,852,898 A | 9/1958 | Berg | 53/182 |
| 2,858,970 A | 11/1958 | Barnes et al. | 229/55 |
| 2,865,768 A | 12/1958 | Barnes et al. | 99/171 |
| D185,399 S | 6/1959 | Tuppor | |
| 2,960,218 A | 11/1960 | Cheeley | |
| 2,961,520 A | 11/1960 | Long | |
| 2,965,501 A * | 12/1960 | Harriss | 426/120 |
| 3,012,895 A | 12/1961 | Stelnicki | |
| 3,027,261 A | 3/1962 | Samara | 99/171 |
| 3,035,754 A | 5/1962 | Meister | 229/53 |
| 3,052,554 A | 9/1962 | Colman | 99/171 |
| 3,068,779 A | 12/1962 | Eidlisz | 99/416 |
| 3,070,275 A * | 12/1962 | Bostrom | 229/4.5 |
| 3,107,989 A | 10/1963 | Fesco | 55/381 |
| 3,109,359 A | 11/1963 | Falla | 99/339 |
| 3,141,400 A | 7/1964 | Powers | |
| 3,179,036 A | 4/1965 | Luker | |
| 3,191,520 A | 6/1965 | Halter | |
| 3,219,460 A | 11/1965 | Brown | |
| 3,220,635 A | 11/1965 | Kasting et al. | 229/57 |
| 3,220,856 A | 11/1965 | Vischer | |
| 3,240,610 A | 3/1966 | Cease | |
| 3,244,537 A | 4/1966 | Cease | |
| 3,246,446 A | 4/1966 | Powers | |
| 3,262,668 A | 7/1966 | Luker | |
| 3,271,169 A | 9/1966 | Baker et al. | |
| 3,286,832 A | 11/1966 | Pilger | 206/56 |
| 3,287,140 A | 11/1966 | Brussell | |
| 3,293,048 A | 12/1966 | Kitterman | 99/171 |
| 3,326,097 A | 6/1967 | Lokey | 93/82 |
| 3,349,941 A * | 10/1967 | Wanderer | 220/23.88 |
| 3,353,327 A | 11/1967 | Cutler et al. | 53/28 |
| 3,353,707 A * | 11/1967 | Eyles | 206/519 |
| 3,357,152 A | 12/1967 | Geigel | 53/29 |
| 3,396,868 A * | 8/1968 | Fitzgerald | 206/508 |
| 3,420,397 A * | 1/1969 | Miller | 220/203.09 |
| 3,421,654 A | 1/1969 | Hexel | |
| 3,424,714 A | 1/1969 | Scoppt et al. | 220/793 |
| 3,445,050 A | 5/1969 | Peters et al. | |
| 3,447,714 A | 6/1969 | Elliot | 206/1.5 |
| 3,489,075 A | 1/1970 | O'Reilly | 99/450 |
| 3,521,788 A * | 7/1970 | Carter et al. | 220/675 |
| 3,547,661 A | 12/1970 | Stevenson | |
| 3,608,770 A | 9/1971 | Naimoli | 220/16 |
| 3,610,135 A | 10/1971 | Sheridan | |
| 3,610,458 A | 10/1971 | Nissley | |
| 3,615,646 A | 10/1971 | Neely et al. | |
| 3,620,834 A | 11/1971 | Duffy | 117/213 |
| 3,637,132 A | 1/1972 | Gray | 229/53 |
| 3,638,784 A | 2/1972 | Bodolay et al. | 206/45.34 |
| 3,641,926 A | 2/1972 | Williams et al. | 99/448 |
| 3,641,992 A * | 2/1972 | Peyser et al. | 126/378.1 |
| 3,647,508 A | 3/1972 | Gorrell | 117/38 |
| 3,669,688 A | 6/1972 | Thompson | |
| 3,718,480 A | 2/1973 | Tremblay et al. | |
| 3,741,427 A | 6/1973 | Doyle | 220/573.4 |
| 3,777,447 A | 12/1973 | Herbine et al. | 53/36 |
| 3,811,374 A | 5/1974 | Mann | |
| 3,835,280 A | 9/1974 | Gades et al. | 219/10.55 |
| 3,836,042 A | 9/1974 | Petitto | |
| 3,844,409 A | 10/1974 | Bodolay et al. | 206/45.34 |
| 3,851,574 A | 12/1974 | Katz et al. | 426/107 |
| 3,865,301 A | 2/1975 | Pothier et al. | |
| 3,873,735 A | 3/1975 | Chalin et al. | 426/87 |
| 3,881,027 A | 4/1975 | Levinson | |
| 3,884,213 A | 5/1975 | Smith | |
| 3,884,383 A * | 5/1975 | Burch et al. | 220/675 |
| 3,893,567 A * | 7/1975 | Davis et al. | 206/520 |
| 3,908,029 A | 9/1975 | Fredrickson | |
| 3,938,730 A * | 2/1976 | Detzel et al. | 229/120.01 |
| 3,941,967 A | 3/1976 | Sumi et al. | |
| 3,956,866 A | 5/1976 | Lattur | 53/29 |
| 3,965,323 A | 6/1976 | Forker, Jr. et al. | |
| 3,970,241 A | 7/1976 | Hanson | 229/58 |
| 3,973,045 A | 8/1976 | Brandberg et al. | 426/110 |
| 3,974,353 A | 8/1976 | Goltsos | |
| 3,975,552 A | 8/1976 | Stangroom | |
| 3,983,256 A | 9/1976 | Norris et al. | |
| 3,985,990 A | 10/1976 | Levinson | |
| 4,018,355 A * | 4/1977 | Ando | 220/522 |
| 4,031,261 A | 6/1977 | Durst | |
| 4,036,423 A | 7/1977 | Gordon | 229/43 |
| 4,038,425 A | 7/1977 | Brandberg et al. | 426/107 |
| 4,043,098 A | 8/1977 | Putnam, Jr. et al. | 53/180 M |
| 4,065,583 A | 12/1977 | Ahlgren | |
| 4,077,853 A | 3/1978 | Coll-Palagos | 204/20 |
| 4,079,853 A | 3/1978 | Casutt | |
| 4,082,184 A * | 4/1978 | Hammer | 206/519 |
| 4,082,691 A | 4/1978 | Berger | |
| 4,096,948 A | 6/1978 | Kuchenbecker | |
| 4,113,095 A * | 9/1978 | Dietz et al. | 206/508 |
| 4,118,913 A | 10/1978 | Putnam, Jr. et al. | 53/551 |
| 4,126,945 A | 11/1978 | Manser et al. | |
| 4,132,811 A | 1/1979 | Standing et al. | 426/111 |
| 4,133,896 A | 1/1979 | Standing et al. | |
| 4,136,505 A | 1/1979 | Putnam, Jr. et al. | 53/551 |
| 4,138,054 A | 2/1979 | Spencer | 229/23 BT |
| 4,140,889 A | 2/1979 | Mason et al. | 219/733 |
| 4,154,860 A | 5/1979 | Daswick | |
| 4,156,806 A | 5/1979 | Teich et al. | 219/10.55 E |
| 4,164,174 A | 8/1979 | Wallsten | 99/415 |
| 4,171,605 A | 10/1979 | Putnam, Jr. et al. | 53/552 |
| 4,184,061 A | 1/1980 | Suzuki et al. | 219/10.55 E |

(56) References Cited

U.S. PATENT DOCUMENTS

| | | | |
|---|---|---|---|
| 4,186,217 A * | 1/1980 | Tchack | 426/523 |
| 4,190,757 A | 2/1980 | Turpin et al. | 219/10.55 E |
| 4,196,331 A | 4/1980 | Leveckis et al. | 219/10.55 E |
| D255,751 S | 7/1980 | Daenen | D7/667 |
| 4,219,573 A | 8/1980 | Borek | 426/107 |
| 4,228,945 A | 10/1980 | Wysocki | |
| 4,230,767 A | 10/1980 | Isaka et al. | 428/349 |
| 4,230,924 A | 10/1980 | Brastad et al. | 219/10.55 E |
| 4,233,325 A | 11/1980 | Slangan et al. | |
| 4,241,563 A | 12/1980 | Müller et al. | 53/511 |
| 4,242,378 A | 12/1980 | Arai | 427/264 |
| 4,258,086 A | 3/1981 | Beall | 219/10.43 |
| 4,264,668 A | 4/1981 | Balla | 428/195 |
| 4,267,420 A | 5/1981 | Brastad | 219/10.55 E |
| 4,279,933 A | 7/1981 | Austin et al. | 426/124 |
| 4,280,032 A | 7/1981 | Levison | |
| 4,283,427 A | 8/1981 | Winters et al. | 426/107 |
| 4,291,520 A | 9/1981 | Prince et al. | 53/551 |
| 4,292,332 A | 9/1981 | McHam | 426/111 |
| 4,304,352 A | 12/1981 | Humphries | 229/31 R |
| 4,306,133 A | 12/1981 | Levinson | |
| 4,316,070 A | 2/1982 | Prosise et al. | 219/10.55 E |
| 4,317,017 A | 2/1982 | Bowen | |
| 4,324,088 A | 4/1982 | Yamashita et al. | 53/527 |
| 4,328,254 A | 5/1982 | Waldburger | |
| 4,335,291 A | 6/1982 | Ishino et al. | 219/10.55 E |
| 4,340,138 A * | 7/1982 | Bernhardt | 206/216 |
| 4,345,133 A | 8/1982 | Cherney et al. | 219/10.55 E |
| 4,348,421 A * | 9/1982 | Sakakibara et al. | 426/394 |
| 4,351,997 A | 9/1982 | Mattisson et al. | |
| 4,355,757 A | 10/1982 | Roccaforte | 229/33 |
| 4,372,523 A * | 2/1983 | McCartney | 249/79 |
| 4,373,511 A | 2/1983 | Miles et al. | 126/369 |
| 4,377,493 A | 3/1983 | Boylan et al. | |
| 4,389,438 A | 6/1983 | Ohtsuki et al. | 428/35 |
| 4,390,555 A | 6/1983 | Levinson | |
| 4,398,994 A | 8/1983 | Beckett | 156/659.1 |
| 4,416,906 A | 11/1983 | Watkins | |
| 4,425,368 A | 1/1984 | Watkins | |
| 4,439,656 A | 3/1984 | Peleg et al. | |
| 4,453,665 A | 6/1984 | Roccaforte et al. | 229/41 B |
| 4,461,031 A | 7/1984 | Blamer | 383/123 |
| 4,477,705 A | 10/1984 | Danley et al. | |
| 4,478,349 A | 10/1984 | Haverland et al. | 220/573.4 |
| 4,481,392 A | 11/1984 | Nibbe et al. | |
| 4,486,640 A | 12/1984 | Bowen et al. | |
| 4,493,685 A | 1/1985 | Blamer | 493/235 |
| 4,496,815 A | 1/1985 | Jorgensen | |
| 4,517,045 A | 5/1985 | Beckett | 156/345 |
| 4,518,651 A | 5/1985 | Wolfe, Jr. | 428/308.8 |
| 4,529,089 A | 7/1985 | Gasbarra et al. | 206/525 |
| 4,532,397 A | 7/1985 | McClelland | |
| D280,058 S | 8/1985 | Carlson | D7/629 |
| 4,535,889 A | 8/1985 | Terauds | 206/527 |
| 4,552,614 A | 11/1985 | Beckett | 156/640 |
| 4,553,010 A | 11/1985 | Bohrer et al. | 219/10.55 E |
| 4,571,337 A | 2/1986 | Cage et al. | 426/107 |
| 4,581,989 A | 4/1986 | Swartley | 99/346 |
| 4,584,202 A | 4/1986 | Roccaforte | 426/111 |
| 4,586,649 A | 5/1986 | Webinger | 229/114 |
| 4,610,755 A | 9/1986 | Beckett | 156/634 |
| 4,612,431 A | 9/1986 | Brown et al. | 219/10.55 E |
| 4,626,352 A | 12/1986 | Massey et al. | 210/469 |
| 4,640,838 A | 2/1987 | Isakson et al. | 426/107 |
| 4,641,005 A | 2/1987 | Seiferth | 219/10.55 E |
| 4,648,549 A | 3/1987 | Trutna | 229/143 |
| 4,657,141 A * | 4/1987 | Sorensen | 206/519 |
| 4,661,326 A | 4/1987 | Schainholz | 422/310 |
| 4,661,671 A | 4/1987 | Maroszek | 219/10.55 E |
| 4,661,672 A | 4/1987 | Nakanaga | |
| 4,677,905 A | 7/1987 | Johnson | 99/413 |
| 4,678,882 A | 7/1987 | Bohrer et al. | 219/10.55 E |
| D291,522 S | 8/1987 | Daenen et al. | D7/667 |
| 4,685,997 A | 8/1987 | Beckett | 156/629 |
| 4,697,703 A | 10/1987 | Will | 206/438 |
| 4,701,585 A | 10/1987 | Stewart | 219/10.55 E |
| 4,703,148 A | 10/1987 | Mikulski et al. | |
| 4,703,149 A | 10/1987 | Sugisawa et al. | |
| 4,705,927 A | 11/1987 | Levendusky et al. | 219/10.55 E |
| 4,713,510 A | 12/1987 | Quick et al. | 219/10.55 E |
| 4,714,012 A | 12/1987 | Hernandez | 99/444 |
| 4,727,706 A | 3/1988 | Beer | 53/434 |
| 4,734,288 A | 3/1988 | Engstrom et al. | 426/107 |
| 4,738,882 A | 4/1988 | Rayford et al. | 428/35 |
| 4,739,698 A | 4/1988 | Allaire | 99/410 |
| 4,739,898 A | 4/1988 | Brown | 220/203 |
| 4,745,249 A | 5/1988 | Daniels | |
| 4,777,053 A | 10/1988 | Tobelmann et al. | |
| 4,794,005 A | 12/1988 | Swiontek | |
| 4,797,010 A | 1/1989 | Coelho | 383/109 |
| 4,803,088 A * | 2/1989 | Yamamoto et al. | 426/107 |
| 4,804,582 A | 2/1989 | Noding et al. | 428/332 |
| 4,806,718 A | 2/1989 | Seaborne et al. | 219/10.55 E |
| 4,808,780 A | 2/1989 | Seaborne | 219/10.55 E |
| 4,810,845 A | 3/1989 | Seaborne | 219/10.55 E |
| 4,818,831 A | 4/1989 | Seaborne | 219/10.55 E |
| 4,825,025 A | 4/1989 | Seiferth | 219/10.55 E |
| 4,842,876 A | 6/1989 | Anderson et al. | |
| 4,846,350 A * | 7/1989 | Sorensen | 206/520 |
| 4,851,246 A | 7/1989 | Maxwell et al. | 426/107 |
| 4,853,505 A | 8/1989 | Sorenson | |
| 4,853,509 A * | 8/1989 | Murakami | 219/731 |
| 4,864,089 A | 9/1989 | Tighe et al. | 219/10.55 E |
| 4,864,090 A | 9/1989 | Maxwell et al. | 219/10.55 E |
| 4,870,233 A | 9/1989 | McDonald | |
| 4,873,919 A | 10/1989 | Janssen | |
| 4,883,936 A | 11/1989 | Maynard et al. | 219/10.55 E |
| 4,892,744 A | 1/1990 | Ylvisaker | 426/111 |
| 4,896,009 A | 1/1990 | Pawlowski | 219/10.55 E |
| 4,899,925 A | 2/1990 | Bowden et al. | |
| 4,904,488 A | 2/1990 | LaBaw et al. | 426/107 |
| 4,914,266 A | 4/1990 | Parks et al. | 219/10.55 E |
| 4,915,216 A * | 4/1990 | Magers | 206/520 |
| 4,915,780 A | 4/1990 | Beckett | 156/661.1 |
| 4,920,251 A | 4/1990 | Whitenack et al. | |
| 4,922,079 A | 5/1990 | Bowen et al. | |
| 4,923,704 A | 5/1990 | Levinson | |
| 4,924,048 A | 5/1990 | Bunce et al. | |
| 4,935,592 A | 6/1990 | Oppenheimer | |
| 4,939,332 A | 7/1990 | Hahn | |
| 4,943,456 A | 7/1990 | Pollart et al. | 428/34.3 |
| 4,948,932 A | 8/1990 | Clough | 219/10.55 E |
| 4,952,765 A | 8/1990 | Toyosawa | |
| 4,959,516 A | 9/1990 | Tighe et al. | 219/10.55 E |
| 4,960,598 A | 10/1990 | Swiontek | |
| 4,961,944 A | 10/1990 | Matoba et al. | |
| 4,963,708 A | 10/1990 | Kearns et al. | |
| D312,189 S | 11/1990 | Noel | |
| 4,973,502 A | 11/1990 | Holzmuller et al. | |
| 4,973,810 A | 11/1990 | Brauner | 219/10.55 E |
| 4,982,064 A | 1/1991 | Hartman et al. | 219/10.55 E |
| 4,987,280 A | 1/1991 | Kanafani et al. | |
| 4,990,349 A | 2/1991 | Chawan et al. | |
| 4,992,638 A | 2/1991 | Hewitt et al. | |
| 5,011,299 A | 4/1991 | Black, Jr. et al. | 383/126 |
| 5,025,715 A | 6/1991 | Sir | |
| 5,026,958 A | 6/1991 | Palacios | |
| 5,035,800 A | 7/1991 | Kopach | 210/469 |
| 5,038,009 A | 8/1991 | Babbitt | 219/10.55 E |
| 5,039,001 A | 8/1991 | Kinigakis et al. | 229/120 |
| 5,041,295 A | 8/1991 | Perry et al. | |
| 5,044,777 A | 9/1991 | Watkins et al. | 383/100 |
| 5,050,791 A | 9/1991 | Bowden et al. | |
| 5,052,369 A | 10/1991 | Johnson | |
| 5,057,331 A | 10/1991 | Levinson | |
| D321,302 S | 11/1991 | Zimmerman | |
| 5,063,072 A | 11/1991 | Gillmore et al. | |
| 5,075,526 A | 12/1991 | Sklenak et al. | |
| 5,077,066 A | 12/1991 | Mattson et al. | |
| 5,081,330 A | 1/1992 | Brandberg et al. | 219/10.55 E |
| 5,094,865 A | 3/1992 | Levinson | |
| 5,095,186 A | 3/1992 | Scott Russell et al. | 219/10.55 E |
| 5,106,635 A | 4/1992 | McCutchan | |
| 5,107,087 A | 4/1992 | Yamada et al. | |

(56) References Cited

U.S. PATENT DOCUMENTS

| | | | |
|---|---|---|---|
| 5,108,768 A * | 4/1992 | So | 426/77 |
| 5,153,402 A | 10/1992 | Quick et al. | 219/10.55 E |
| 5,176,284 A | 1/1993 | Sorensen | |
| 5,189,947 A | 3/1993 | Yim | 99/415 |
| 5,190,777 A | 3/1993 | Anderson et al. | |
| 5,195,829 A | 3/1993 | Watkins et al. | 383/100 |
| 5,200,590 A | 4/1993 | Bowen et al. | 219/10.55 E |
| D335,445 S | 5/1993 | Detert et al. | D9/761 |
| D335,821 S | 5/1993 | Detert et al. | D9/761 |
| D336,242 S | 6/1993 | Detert et al. | D9/761 |
| 5,223,291 A | 6/1993 | Levinson et al. | |
| 5,230,914 A | 7/1993 | Akervik et al. | |
| 5,241,149 A | 8/1993 | Watanabe et al. | |
| D341,990 S | 12/1993 | Yim | |
| 5,294,765 A | 3/1994 | Archibald et al. | 219/727 |
| 5,298,708 A | 3/1994 | Babu et al. | 219/728 |
| 5,300,747 A | 4/1994 | Simon | |
| 5,315,083 A | 5/1994 | Green | |
| 5,363,750 A | 11/1994 | Miller et al. | 99/426 |
| D353,303 S | 12/1994 | Davis | |
| 5,370,042 A | 12/1994 | Tolchin et al. | |
| 5,423,453 A | 6/1995 | Fritz | |
| 5,520,301 A * | 5/1996 | Sohn | 220/265 |
| D370,598 S | 6/1996 | Koch | |
| D371,963 S | 7/1996 | Ahern, Jr. | |
| 5,540,381 A | 7/1996 | Davis | 229/103.2 |
| 5,558,798 A | 9/1996 | Tsai | |
| D376,512 S | 12/1996 | Klemme | D7/538 |
| 5,588,587 A | 12/1996 | Stier et al. | |
| D378,565 S | 3/1997 | Cousins | D7/667 |
| D378,566 S | 3/1997 | Cousins | D7/667 |
| 5,645,300 A | 7/1997 | Hill | |
| 5,645,762 A | 7/1997 | Cook et al. | |
| 5,650,084 A | 7/1997 | Bley | 219/727 |
| D384,555 S | 10/1997 | Bradley | |
| 5,674,546 A | 10/1997 | Barnes et al. | |
| D386,042 S | 11/1997 | Miller | |
| 5,690,853 A | 11/1997 | Jackson et al. | 219/727 |
| 5,695,801 A | 12/1997 | Oh | |
| 5,698,306 A | 12/1997 | Prosise | |
| 5,704,485 A * | 1/1998 | Cautereels et al. | 206/546 |
| 5,718,933 A | 2/1998 | Fultz | 426/115 |
| D391,440 S | 3/1998 | Cousins | D7/360 |
| 5,726,426 A | 3/1998 | Davis et al. | |
| 5,741,534 A | 4/1998 | Chung | |
| 5,747,086 A | 5/1998 | Bows et al. | |
| 5,753,895 A | 5/1998 | Olson et al. | 219/727 |
| 5,770,840 A | 6/1998 | Lorence | |
| 5,807,597 A | 9/1998 | Barnes et al. | |
| D405,561 S | 2/1999 | Willinger et al. | D30/129 |
| 5,866,041 A | 2/1999 | Svarz et al. | |
| 5,869,120 A | 2/1999 | Blazevich | 426/132 |
| 5,871,790 A | 2/1999 | Monier et al. | 426/107 |
| 5,876,811 A | 3/1999 | Blackwell et al. | |
| 5,900,264 A | 5/1999 | Gics | |
| 5,913,966 A | 6/1999 | Arnone et al. | 99/413 |
| 5,916,470 A | 6/1999 | Besser et al. | |
| 5,916,620 A | 6/1999 | Oh | |
| 5,925,281 A | 7/1999 | Levinson | |
| 5,928,554 A | 7/1999 | Olson et al. | 219/727 |
| 5,931,333 A * | 8/1999 | Woodnorth et al. | 220/573.4 |
| 5,961,872 A | 10/1999 | Simon et al. | |
| 5,970,858 A | 10/1999 | Boehm et al. | 99/446 |
| 5,974,953 A | 11/1999 | Messerli | 99/340 |
| 5,986,248 A | 11/1999 | Matsuno et al. | 219/728 |
| 5,988,045 A | 11/1999 | Housley | |
| 5,988,050 A | 11/1999 | Foster, Jr. | 99/467 |
| D418,017 S | 12/1999 | Henry | |
| D419,371 S | 1/2000 | Haley | D7/392.1 |
| 6,018,157 A | 1/2000 | Craft | |
| 6,042,856 A | 3/2000 | Sagan et al. | 426/87 |
| D422,176 S | 4/2000 | Laib | |
| 6,049,072 A | 4/2000 | Olson et al. | 219/727 |
| 6,085,930 A | 7/2000 | Curtis | 220/371 |
| 6,097,017 A | 8/2000 | Pickford | |
| 6,103,291 A | 8/2000 | Fernandez Tapia | 426/523 |
| 6,106,882 A | 8/2000 | Oh et al. | |
| D432,414 S | 10/2000 | Simpson et al. | D9/711 |
| D432,914 S | 10/2000 | Hayes et al. | |
| 6,126,976 A | 10/2000 | Hasse et al. | |
| 6,136,355 A | 10/2000 | Fukuyama | |
| D433,884 S | 11/2000 | Fujimoto | D7/667 |
| 6,147,337 A | 11/2000 | Besser | |
| 6,150,646 A | 11/2000 | Lai et al. | |
| 6,168,044 B1 | 1/2001 | Zettle | |
| 6,175,105 B1 | 1/2001 | Rubbright et al. | |
| 6,180,148 B1 | 1/2001 | Yajima | |
| 6,180,150 B1 | 1/2001 | Schäfer | |
| 6,183,789 B1 | 2/2001 | Nilsson et al. | |
| 6,187,354 B1 | 2/2001 | Hopkins | |
| 6,192,792 B1 | 2/2001 | Gremillion | |
| 6,217,918 B1 | 4/2001 | Oh et al. | |
| D441,597 S | 5/2001 | Wyche | |
| D442,425 S | 5/2001 | Wyche | |
| 6,229,131 B1 | 5/2001 | Koochaki | |
| 6,230,919 B1 | 5/2001 | Guillin | 220/315 |
| D445,633 S | 7/2001 | Bradley | |
| D449,102 S | 10/2001 | Shin | D23/366 |
| D449,495 S | 10/2001 | Tucker et al. | |
| 6,309,684 B2 | 10/2001 | Hopkins, Sr. | |
| 6,394,337 B1 | 5/2002 | Ross et al. | 229/103.2 |
| 6,396,036 B1 | 5/2002 | Hanson | 219/727 |
| 6,422,453 B1 | 7/2002 | Wang | |
| 6,455,084 B2 | 9/2002 | Johns | |
| 6,463,844 B1 | 10/2002 | Wang et al. | |
| 6,467,399 B1 | 10/2002 | Boutte | |
| 6,486,455 B1 | 11/2002 | Merabet | |
| D466,762 S | 12/2002 | Cote et al. | D7/545 |
| 6,509,047 B2 | 1/2003 | Edomwonyi | |
| D470,768 S | 2/2003 | Melhede | D9/428 |
| 6,559,431 B2 | 5/2003 | Hopkins | |
| 6,565,910 B1 | 5/2003 | Schell et al. | 426/589 |
| D477,187 S | 7/2003 | McCallister et al. | |
| 6,608,292 B1 | 8/2003 | Barnes | |
| 6,612,482 B2 | 9/2003 | Ross | 229/103.2 |
| 6,645,539 B2 | 11/2003 | Bukowski et al. | |
| D483,616 S | 12/2003 | Thonis | |
| D485,473 S | 1/2004 | Dais et al. | D7/629 |
| 6,727,484 B2 | 4/2004 | Policappelli | |
| 6,803,551 B2 | 10/2004 | Kim et al. | 219/731 |
| D497,774 S | 11/2004 | Smith et al. | D7/543 |
| 6,818,873 B2 | 11/2004 | Savage et al. | |
| 6,840,159 B1 | 1/2005 | Li | 99/337 |
| D502,847 S | 3/2005 | Leonori | D7/667 |
| 6,868,980 B2 | 3/2005 | Schultz et al. | 220/367.1 |
| D505,048 S | 5/2005 | Cornfield | D7/409 |
| D505,590 S | 5/2005 | Greiner et al. | D7/409 |
| D508,822 S | 8/2005 | Smith et al. | |
| D513,942 S | 1/2006 | De Groote | D7/665 |
| 7,008,214 B2 | 3/2006 | Faddi | 425/382 R |
| 7,022,359 B2 | 4/2006 | Montserrate Gibernau | |
| 7,025,213 B2 | 4/2006 | Chen | 210/474 |
| D521,380 S | 5/2006 | Jackson et al. | |
| 7,038,181 B2 | 5/2006 | Edmark | |
| 7,045,190 B2 | 5/2006 | Inagaki et al. | |
| D526,840 S | 8/2006 | Carlson | D7/392.1 |
| 7,090,090 B2 | 8/2006 | Ohyama | |
| D529,797 S | 10/2006 | Wilcox et al. | D9/428 |
| D543,796 S | 6/2007 | Lion et al. | D7/667 |
| D552,433 S | 10/2007 | Stewart | D7/667 |
| D557,982 S | 12/2007 | Ablo | D7/409 |
| D558,536 S | 1/2008 | Curtin | D7/667 |
| D558,602 S | 1/2008 | Kissner et al. | D9/711 |
| D563,157 S | 3/2008 | Bouveret et al. | |
| D564,287 S | 3/2008 | Bouveret et al. | |
| D564,307 S | 3/2008 | Repp | D7/667 |
| D571,656 S | 6/2008 | Maslowski | D9/425 |
| D577,295 S | 9/2008 | Miller et al. | D9/711 |
| D582,201 S | 12/2008 | Kellermann | |
| D582,791 S | 12/2008 | Elmerhaus | D9/721 |
| 7,468,498 B2 | 12/2008 | Tuszkiewicz et al. | 219/725 |
| D584,111 S | 1/2009 | Eide et al. | D7/667 |
| D584,145 S | 1/2009 | Young | |
| D590,663 S | 4/2009 | Simon et al. | |

(56) References Cited

U.S. PATENT DOCUMENTS

| | | | |
|---|---|---|---|
| D591,591 S | 5/2009 | Moecks et al. | |
| D592,948 S | 5/2009 | Mayer | D9/418 |
| D593,369 S | 6/2009 | Green et al. | D7/602 |
| D594,328 S | 6/2009 | Shapiro et al. | D7/435 |
| D598,717 S | 8/2009 | Jalet | D7/667 |
| D607,095 S | 12/2009 | LeMay et al. | D23/366 |
| D610,903 S | 3/2010 | Shapiro et al. | D9/428 |
| D611,300 S | 3/2010 | Chen et al. | D7/409 |
| D612,196 S | 3/2010 | Furlong | D7/392.1 |
| D613,131 S | 4/2010 | Chen et al. | D7/667 |
| D630,061 S | 1/2011 | Kellermann | |
| D630,507 S | 1/2011 | Short et al. | D9/427 |
| D630,940 S | 1/2011 | Shapiro et al. | D9/428 |
| D632,561 S | 2/2011 | Short et al. | D9/427 |
| D633,810 S | 3/2011 | Jenkins | D9/721 |
| 7,977,612 B2 | 7/2011 | Levy et al. | 219/729 |
| 2001/0035402 A1 | 11/2001 | Barrow | 219/432 |
| 2001/0043971 A1 | 11/2001 | Johns | |
| 2001/0050002 A1 | 12/2001 | Bonanno | |
| 2002/0096450 A1* | 7/2002 | Garst | 206/516 |
| 2002/0110622 A1 | 8/2002 | Lloyd et al. | 426/115 |
| 2003/0003200 A1 | 1/2003 | Bukowski et al. | |
| 2003/0068411 A1* | 4/2003 | McCallister et al. | 426/107 |
| 2003/0167932 A1 | 9/2003 | Chen | |
| 2003/0213718 A1 | 11/2003 | Ducharme et al. | |
| 2004/0058038 A1 | 3/2004 | Lee | |
| 2004/0107637 A1* | 6/2004 | Sieverding | 47/83 |
| 2004/0121049 A1 | 6/2004 | Ebner et al. | |
| 2004/0164075 A1 | 8/2004 | Henze et al. | |
| 2004/0216620 A1 | 11/2004 | Quiggins et al. | |
| 2004/0238438 A1 | 12/2004 | Chen | 210/474 |
| 2005/0040161 A1 | 2/2005 | Lin et al. | |
| 2005/0051549 A1* | 3/2005 | Nelson | 220/23.83 |
| 2005/0069602 A1 | 3/2005 | Faddi | 425/208 |
| 2005/0079250 A1 | 4/2005 | Mao et al. | 426/113 |
| 2005/0079252 A1 | 4/2005 | Kendig et al. | 426/125 |
| 2005/0082305 A1 | 4/2005 | Dais et al. | |
| 2005/0092762 A1 | 5/2005 | Murat et al. | |
| 2005/0109772 A1 | 5/2005 | Thorpe et al. | |
| 2005/0112243 A1 | 5/2005 | Bellmann | 426/106 |
| 2005/0115417 A1 | 6/2005 | Murat et al. | 99/413 |
| 2005/0208182 A1 | 9/2005 | Gilbert et al. | 426/87 |
| 2005/0220939 A1 | 10/2005 | Morrow | 426/86 |
| 2005/0229793 A1 | 10/2005 | Wengrovsky | 99/483 |
| 2005/0256060 A1 | 11/2005 | Hilgers et al. | 514/25 |
| 2005/0271776 A1 | 12/2005 | Siegel | 426/138 |
| 2005/0281921 A1 | 12/2005 | Langston et al. | |
| 2006/0013929 A1 | 1/2006 | Morris et al. | |
| 2006/0088678 A1 | 4/2006 | Berrier et al. | |
| 2006/0110498 A1 | 5/2006 | Dellinger et al. | |
| 2006/0118552 A1 | 6/2006 | Tiefenback | |
| 2006/0121168 A1 | 6/2006 | Flaherty et al. | |
| 2006/0151339 A1 | 7/2006 | Bradley et al. | |
| 2006/0236593 A1 | 10/2006 | Cap | |
| 2006/0260598 A1 | 11/2006 | Bjork et al. | |
| 2006/0289522 A1 | 12/2006 | Middleton et al. | 219/730 |
| 2007/0029314 A1 | 2/2007 | Rodgers et al. | |
| 2007/0059406 A1 | 3/2007 | Shahsavarani | 426/106 |
| 2007/0090103 A1 | 4/2007 | France et al. | |
| 2007/0116806 A1 | 5/2007 | Parsons | |
| 2007/0131679 A1 | 6/2007 | Edwards et al. | |
| 2007/0181008 A1 | 8/2007 | Paulick et al. | |
| 2007/0251874 A1 | 11/2007 | Stewart | 210/232 |
| 2008/0069485 A1 | 3/2008 | France et al. | |
| 2008/0138473 A1 | 6/2008 | Pawlick et al. | |
| 2008/0178744 A1 | 7/2008 | Hill | 99/323.5 |
| 2008/0210686 A1 | 9/2008 | Shapiro et al. | |
| 2009/0022858 A1 | 1/2009 | Pawlick | |
| 2009/0035433 A1 | 2/2009 | France et al. | |
| 2009/0078125 A1 | 3/2009 | Pawlick et al. | |
| 2009/0142455 A1 | 6/2009 | Parsons | 426/120 |
| 2010/0015293 A1 | 1/2010 | Shapiro | |

FOREIGN PATENT DOCUMENTS

| | | |
|---|---|---|
| EP | 0326105 A1 | 8/1989 |
| EP | 0449643 A1 | 5/1995 |
| EP | 1 352 841 A1 | 4/2002 |
| EP | 1 245 504 A1 | 10/2002 |
| EP | 1 352 848 A1 | 10/2003 |
| EP | 1 514 804 A1 | 3/2005 |
| EP | 1 464 262 B1 | 7/2005 |
| EP | 1 612 150 A1 | 1/2006 |
| EP | 1 749 757 A2 | 2/2007 |
| FR | 2 631 315 A3 | 11/1989 |
| FR | 2 774 262 | 8/1999 |
| FR | 2 774 262 A1 | 8/1999 |
| FR | 2 846 196 A1 | 4/2004 |
| FR | 2 860 213 | 4/2005 |
| FR | 2 929 491 | 10/2009 |
| GB | 1560488 | 2/1980 |
| GB | 2 218 962 A | 11/1989 |
| GB | 2 295 371 A | 5/1996 |
| GB | 2 308 465 A | 6/1997 |
| GB | 2340823 | 3/2000 |
| JP | 2-109882 | 4/1990 |
| JP | 4367476 A | 12/1992 |
| JP | 06293366 | 10/1994 |
| JP | 09051767 | 2/1997 |
| JP | 10094370 A | 4/1998 |
| JP | 10-129742 | 5/1998 |
| JP | 11113511 | 4/1999 |
| JP | 2001348074 A | 12/2001 |
| JP | 2005059863 A | 3/2005 |
| JP | 2005-312923 | 11/2005 |
| JP | 2006-34645 | 2/2006 |
| JP | 2010-189031 | 9/2010 |
| MX | 01011879 A | 6/2002 |
| SU | 1149999 A | 4/1985 |
| WO | WO 86/00275 | 1/1986 |
| WO | WO 96/07604 | 3/1996 |
| WO | WO 98/33399 | 8/1998 |
| WO | WO 99/59897 | 11/1999 |
| WO | WO 02/051716 | 7/2002 |
| WO | WO 03/086882 | 10/2003 |
| WO | WO 2004/045970 A1 | 6/2004 |
| WO | WO 2006/098950 A2 | 9/2006 |
| WO | WO 2006/128156 A2 | 11/2006 |
| WO | WO 2006/136825 | 12/2006 |
| WO | WO 2007/003864 A2 | 1/2007 |
| WO | WO 2008/109448 A2 | 9/2008 |
| WO | WO 2008/109448 A3 | 9/2008 |
| WO | WO 2009/097030 A1 | 8/2009 |
| WO | WO 2009/136038 A1 | 11/2009 |

OTHER PUBLICATIONS

France, D.W., "Steam Cooking Apparatus," U.S. Appl. No. 60/728,468, filed Oct. 20, 2005.

Anchor Hocking '70 Catalog, p. 83, baking dishes at #4, 5 and 6 (Oct. 1970).

McCallister, "Microwaveable Pasta Product," U.S. Appl. No. 09/965,300, filed Sep. 28, 2001.

U.S. Official Action mailed Apr. 24, 2009, in U.S. Appl. No. 11/286,008.

http://www.unclebens.de/produkte/heiss_auf_reis/heiss_auf_rein_uebersicht.aspx Undated.

http://www.buypastanmore.com Undated.

U.S. Appl. No. 29/346,147, filed Oct. 27, 2009 entitled "Container Assembly".

U.S. Appl. No. 29/346,148, filed Oct. 27, 2009 entitled Container Basket.

U.S. Appl. No. 29/364,804, filed Jun. 29, 2010 entitled "Container Assembly".

U.S. Appl. No. 29/364,807, filed Jun. 29, 2010 entitled "Container Basket".

Certified priority document in U.S. Appl. No. 12/012,403, filed Feb. 2, 2008 (filed in Int'l Application No. PCT/US2008/080874 on Nov. 3, 2008).

http://www.pastanmoresale.com, site accessed Jun. 15, 2010, 2 pgs. (now being sold at http://pastaboat.com).

(56) References Cited

OTHER PUBLICATIONS

Machine translation FR 2774262, Etimble et al., 08.1999, 9 pgs.
Invitation to Pay Additional Fees with Partial International Search mailed Jun. 25, 2008.
International Search Report dated Aug. 20, 2008, Application No. PCT/US2008/055512.
International Search Report dated Oct. 20, 2008, Application No. PCT/US2008/071917.
International Search Report dated Jan. 12, 2009, Application No. PCT/US2008/077353.
European Office Action Mailed Jul. 15, 2010 in Application No. 08731136.1.
U.S. Official Action Mailed Dec. 11, 2008 in U.S. Appl. No. 11/286,008.
U.S. Official Action Mailed Oct. 16, 2009 in U.S. Appl. No. 11/903,732.
U.S. Official Action Mailed Oct. 29, 2009 in U.S. Appl. No. 11/890,297.
U.S. Official Action Mailed Nov. 12, 2009 in U.S. Appl. No. 11/286,008.
U.S. Official Action Mailed Mar. 10, 2010 in U.S. Appl. No. 11/903,732.
U.S. Official Action Mailed Mar. 29, 2010 in U.S. Appl. No. 29/351,253.
U.S. Official Action Mailed May 21, 2010 in U.S. Appl. No. 11/286,008.
U.S. Official Action Mailed May 25, 2010 in U.S. Appl. No. 11/423,259.
U.S. Official Action Mailed Oct. 7, 2010 in U.S. Appl. No. 11/703,066.
U.S. Official Action Mailed Nov. 10, 2010 in U.S. Appl. No. 11/423,259.
U.S. Official Action mailed Jul. 15, 2011, in U.S. Appl. No. 11/423,259.
European Search Report dated Jan. 27, 2011, in Application No. 08832921.4-1261.
U.S. Official Action Mailed Dec. 9, 2010 in U.S. Appl. No. 29/346,147.
U.S. Official Action Mailed Dec. 9, 2010 in U.S. Appl. No. 29/346,148.
U.S. Official Action Mailed Dec. 28, 2010 in U.S. Appl. No. 29/364,804.
U.S. Official Action Mailed Feb. 23, 2011 in U.S. Appl. No. 29/369,419.
U.S. Official Action Mailed Mar. 21, 2011 in U.S. Appl. No. 11/703,066.
U.S. Official Action Mailed Apr. 6, 2011 in U.S. Appl. No. 12/277,886.
U.S. Official Action Mailed Apr. 8, 2011 in U.S. Appl. No. 29/369,416.
U.S. Official Action Mailed Apr. 12, 2011 in U.S. Appl. No. 29/369,423.
Supp. International Search Report dated Mar. 15, 2011, Application No. PCT/CA2006/001894.
Starmaid Microwave Steamer Jun. 6, 2006, [on line], retrieved on Oct. 13, 2011. Retrieved from the Internet: URL:<http://www.flickr.com/photos/starmaid/5180262532/>.
Progressive International Mini Steamer (on line), Jul. 18, 2006. Retrieved from the Internet at the URL listed in the column immediately following this column.
http://www.google.com/search?q=microwave+steamer&hl=en&biw=1291&bih=1015&sa=X&ei=0ZuXTtqGMKbt0gGMyoHWBA&ved=0CAkQpwUoBg&source+Int&tbs=cdr%3A1%2Ccd_min%3A%2Ccd_max%3A8%2F2007&tbm=#pq=microwave+steamer&hl=en&sugexp=gsih&cp=12&gs_id=9&xhr=micro-wave+mini+steamer&pf=p&sclient=psy-ab&biw=1291&bih=1015&tbs=img:1%2Ccdr%3A1%2Ccd_max%3A8%2F2%2006&.

Mini Steamer—Progressive / Starmaid vegatable steamer, [on line], retrieved Oct. 21, 2011. Retrieved from the Internet: URL:<http://www.campingcookwarepro.com/Progressive_International_Microwave_Mini_Steamer>.
Tupperware India, Cook easy Microsteamer, The Hindu Business Line, [on line], Jun. 26, 2003, retrieved on Oct. 21, 2011. Retrieved from the Internet: URL:<http://www.thehindubusinessline.in/catalyst/2003/06/26/stories/2003062600070406.htm>.
Microwave mini steamer, Lunch in a Box. [on line] Feb. 12, 2007, retrieved on Oct. 13, 2011. Retrieved from the Internet: URL:<http://www.flickr.com/photos/24506652@N00/388209604/>.
Microwave steamer 2, Oct. 16, 2006. [on line]. Retrieved from the Internet: URL:<http://www.flickr.com/photos/momsinmind/271170248/>.
European Allowance dated Jul. 18, 2011, in Application No. 10163678.5-2308.
U.S. Official Action mailed Aug. 5, 2011, in U.S. Appl. No. 11/286,008.
U.S. Official Action mailed Aug. 9, 2011, in U.S. Appl. No. 11/903,732.
U.S. Official Action mailed Aug. 11, 2011, in U.S Appl. No. 11/703,066.
U.S. Official Action mailed Nov. 7, 2011, in U.S. Appl. No. 11/890,297.
U.S. Official Action mailed Dec. 20, 2011, in U.S. Appl. No. 11/423,259.
U.S. Official Action mailed Jan. 11, 2012, in U.S. Appl. No. 11/703,066.
U.S. Official Action mailed Jan. 19, 2012, in U.S. Appl. No. 11/286,008.
U.S. Official Action mailed Jan. 25, 2012, in U.S. Appl. No. 11/903,732.
U.S. Official Action mailed May 2, 2012, in U.S. Appl. No. 11/903,732.
U.S. Official Action mailed May 2, 2012, in U.S. Appl. No. 12/040,641.
Starmaid Microwave Steamer Jun. 26, 2006, [on line], retrieved on Oct. 13, 2011. Retrieved from the Internet: URL:<http://www.flickr.com/photos/starmaid/5180282532/>.
htt://www.google.com/search?q=microwave+steamer&hl=en&biw=1291&bih=1015&sa=X&ei=0ZuXTtqGMKbt0gGMyoHWBA&ved=0CAkQpwUoBg&source=Int&tbs=cdr%3A1%2Ccd_min%3ACcd_max%3A8%2F2%2F2007&tbm=#pq=microwave+steamer&hl=en&sugexp=gsih&cp=12&gs_id=9&xhr=t&q=microwave+mini+steamer&pf=p&sclient=psy-ab&biw=1291&bih=1015&tbs=img:1%2Ccdr%3A1%2Ccd_max%3A8%2F2%2F2006&.
Mini Steamer—Progressive International / Starmaid vegetable steamer, [on line], retrieved Oct. 21, 2011. Retrieved from the Internet: URL:<http://www.campingcookwarepro.com/Progressive_International_Microwave_Mini_Steamer>.
Microwave mini steamer, Lunch in a Box, [on line]Feb. 12, 2007, retrieved on Oct. 13, 2011. Retrieved from the Internet: URL:<http://www.flickr.com/photos/24506652@N00/388209604/>.
Microwave steamer 2, Oct. 16, 2006, [on line]. Retrieved from the Internet: URL:<http://www.flickr.com/photos/momsinmind/271170248/>.
U.S. Official Action mailed Jul. 3, 2013, in U.S. Appl. No. 11/286,008.
U.S. Official Action mailed Aug. 21, 2013, in U.S. Appl. No. 11/890,297.
U.S. Official Action mailed Sep. 10, 2012, in U.S. Appl. No. 11/903,732.
Succinylated Monoglycerides; http://www.fao.org/ag/agn/jecfa-additives/specs/Monograph1/Additive-443.pdf; 1982; obtained Sep. 14, 2012.
U.S. Official Action mailed Sep. 24, 2012, in U.S. Appl. No. 12/471,114.
U.S. Official Action mailed Sep. 25, 2012, in U.S. Appl. No. 12/040,641.
U.S. Official Action mailed Oct. 3, 2013, in U.S. Appl. No. 11/703,066.

(56) References Cited

OTHER PUBLICATIONS

U.S. Official Action mailed Sep. 27, 2013, in U.S. Appl. No. 11/423,259.
U.S. Official Action mailed Sep. 19, 2013, in U.S. Appl. No. 12/471,114.
U.S. Official Action Mailed Jan. 16, 2014, in U.S. Appl. No. 12/277,886.
U.S. Official Action Mailed Jan. 16, 2014, in U.S. Appl. No. 11/286,008.
U.S. Official Action Mailed Jan. 22, 2014, in U.S. Appl. No. 12/471,114.
U.S. Official Action Mailed Jan. 29, 2014, in U.S. Appl. No. 12/040,641.
U.S. Notice of Allowance and Fees Due in U.S. Appl. No. 29/424,416.
"Propylene Glycol Monostearate"; *Hawley's Condensed Chemical Dictionary Thirteenth Edition*; 1997.
U.S. Official Action mailed Jan. 24, 2013, in U.S. Appl. No. 12/471,114.
International Search Report mailed Dec. 4, 2013 in Application No. PCT/US2013/044064.
U.S. Official Action Mailed Mar. 21, 2014, in U.S. Appl. No. 11/703,066.
U.S. Official Action Mailed Apr. 14, 2014, in U.S. Appl. No. 11/423,259.
U.S. Official Action Mailed Apr. 21, 2014, in U.S. Appl. No. 11/424,520.
U.S. Official Action Mailed Jun. 16, 2014, in U.S. Appl. No. 12/277,886.

* cited by examiner

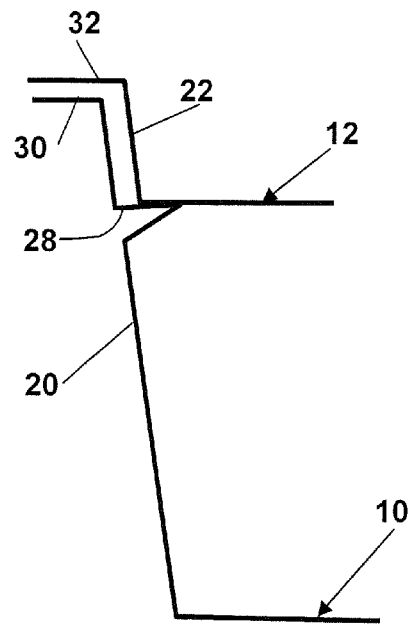
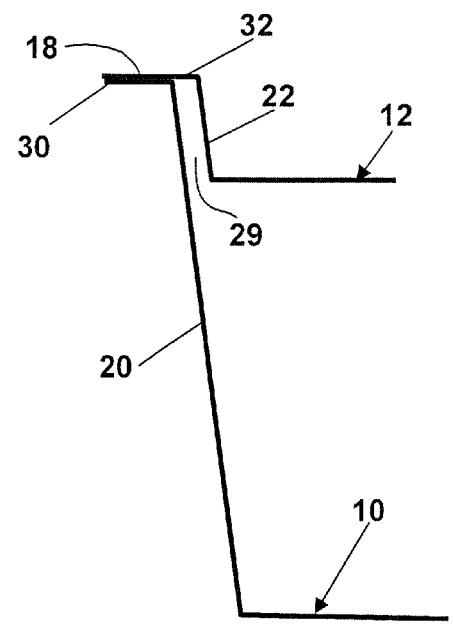
FIG. 5          FIG. 6
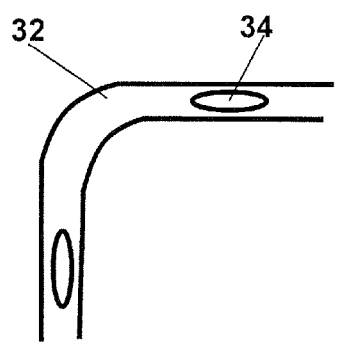
FIG. 7

FOOD TRAY

BACKGROUND

Food trays for holding and heating a food product are well known. One type in common use has a single compartment. When a pasta or other low value product is heated for consumption in the single compartment, any sauce, which may contain meat and or vegetables, is layered on top or beside of the low value product. Heating of the food arranged in this manner causes the flavours to blend and textures to deteriorate. Another food tray has two compartments, one beside the other. Heating does not cause blending of flavour, but having to spoon sauce from one compartment to another for consumption by the customer is inconvenient.

In another food tray available in Europe from InterFrost GmbH, a smaller paperboard tray is nested snugly within a larger paperboard tray. The two trays fit tightly together. Sauce may be placed in the smaller tray, and pasta or rice in the larger tray. Upon heating of the InterFrost food tray, steam may build Up in the lower tray, and may be released suddenly when the smaller tray is removed from the larger tray. In addition, due to the close tight fit of the smaller tray in the larger tray, the smaller tray tends to stick in the larger tray, and pulling on the smaller tray can result in a sudden release of the smaller tray, causing a risk of spilling hot food product from the smaller tray. The steam and heat generated from the lower tray may cause the upper tray to deconstruct, which increases the probability of spillage. Risk of steam release and hot food spill makes the food tray somewhat of a hazard to use.

SUMMARY

The food tray claimed here is intended to provide the advantages of separate heating of low and high value food products, while reducing the risk of spillage and steam release. In addition, the claimed food tray is convenient to use, and provides a pleasing aspect to the user.

Therefore, there is provided a food tray comprising a lower tray containing a first food product and an upper tray nested stably at least partly inside the lower tray, with the upper tray containing a second food product. In one embodiment, an air permeable interface is provided between the upper tray and lower tray to allow venting of steam from the lower tray during cooking. In one embodiment, a cover is provided for the upper food tray. Each of the lower tray and the upper tray may be formed of a material that is suitable for use in a microwave oven. Various constructions may be used to create the air permeable interface, such as lugs, ledges and lips. The upper tray may sit above the lower tray. The trays are preferably nested loosely for ease of removal of the upper tray from the lower tray. Various configurations of cover may be used such as a sleeve, carton, lid or plastic film. The upper tray may contain the higher value food product.

There is also provided a method of cooking food products of different value, the method comprising the steps of providing a food tray comprising a first food product in a lower tray and a second food product in an upper tray nested loosely in the lower tray; and subjecting the food tray to food heating energy while permitting steam to escape from the lower tray.

One embodiment of a food tray comprises a lower tray containing a first food product and an upper tray nested stably at least partly inside the lower tray, with the upper tray containing a second food product, and in which the top of the upper tray is level with the top of the lower tray.

A further embodiment of a food tray comprises a lower tray containing a first food product and an upper tray nested stably at least partly inside the lower tray, with the upper tray containing a second food product, and in which there are indents in either or both the upper tray or lower tray for ease of removal of the upper tray.

A further embodiment of a food tray comprises a lower tray containing a first food product and an upper tray nested stably at least partly inside the lower tray, with the upper tray containing a second food product in which the lower tray has a base, and the peripheral wall of the lower tray is formed in upper and lower parts, the upper part angling outward at a greater angle with respect to the base than the lower part.

A further embodiment of a food tray comprises a lower tray containing a first food product and an upper tray nested stably at least partly inside the lower tray, with the upper tray containing a second food product, in which the upper tray comprises a peripheral wall and a downward facing shoulder extending at least partly around the upper tray, with the downward facing shoulder resting on the upward facing shoulder.

These and other aspects of the food tray are set out in the claims, which are incorporated here by reference.

BRIEF DESCRIPTION OF THE FIGURES

Preferred embodiments of the food tray will now be described with reference to the figures, in which like reference characters denote like elements, by way of example, and in which:

FIG. 5 is a section through a further embodiment of a food tray;

FIG. 6 is a section through a still further embodiment of a food tray;

FIG. 7 is a top view of the upper food tray shown in FIG. 6;

DETAILED DESCRIPTION

In the claims, the word "comprising" is used in its inclusive sense and does not exclude other elements being present. The indefinite article "a" before a claim feature does not exclude more than one of the feature being present.

Figure 1:
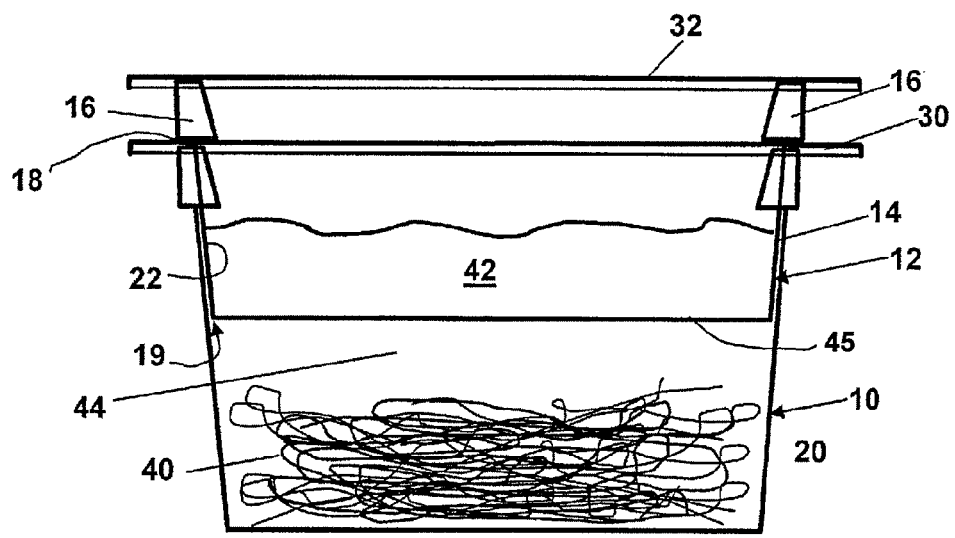
FIG. 1 is a section through a food tray comprising an upper tray and lower tray according to an embodiment of the invention.
Figure 2:
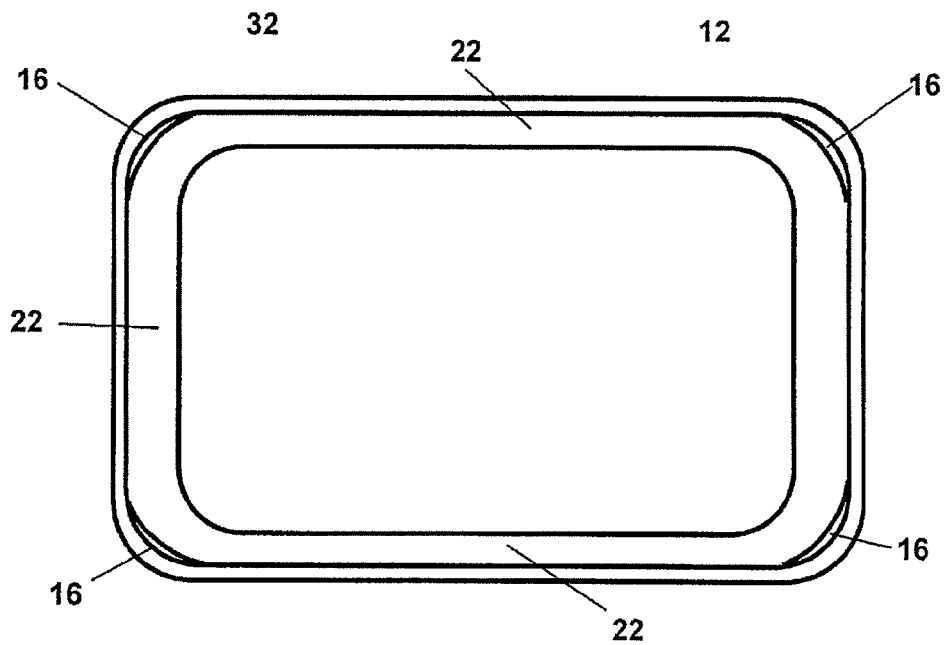
FIG. 2 is a top view of the food tray of FIG. 1.

As shown in FIGS. 1 and 2, a food tray is formed from a lower tray 10 and an upper tray 12 nested stably at least partly inside the lower tray 10. An air permeable interface 14 is provided between the upper tray 12 and lower tray 10 by outwardly extending lugs 16 at the corners of the upper tray 12. The lugs 16 rest on top of the upper edge 18 of the lower tray 10 with a gap 19 between the upper tray 12 and lower tray 10. The gap 19 may extend around the perimeter of the lower tray 12. With a gap between the lower tray 10 and upper tray 12, when product in the lower tray 10 is heated, any steam produced can vent through the gap 19.

The lugs 16 and gap 19 permit the upper tray 12 to sit loosely on the lower tray 10. The only force retarding removal of the upper tray 12 from the lower tray 10 is the force of gravity on the upper tray 12 and its contents. Removal of the upper tray 12 from the lower tray 10 is therefore frictionless. The lugs 16 are at the corners of the upper tray 12 as shown, but may be anywhere around the periphery of the upper tray 12. Four lugs are convenient, and there should be a sufficient number of lugs suitably spaced around the periphery of the upper tray 12 so that the upper tray is stable, and is resistant against tipping. To assist stability, the lugs 16 should be near the top of the upper tray 12 so that the main mass of the upper tray 12 and its contents are below the lugs 16.

Both the upper tray 12 and lower tray 10 include respective lips 32 and 30. The lips 32, 30 should be at least 3 mm wide for easy of sealing.

Each of the lower tray 10 and upper tray 12 may be made by injection moulding, thermoforming or any other suitable manufacturing process. The sidewalls 20 of the lower tray 10 and the sidewalls 22 of the upper tray 12 each may have the same nesting angle. The nesting angle of a tray is the angle between the sidewalls and a perpendicular to the plane defined by the upper edge of the tray. The upper tray 12 may be made in the same mould as the lower tray 10, but with an insert in the mould to reduce the volume. The upper tray 12 and the lower tray 10 should be formed of a material that is suitable for use in a microwave oven, and also may be formed of a material suitable for use in a conventional oven. Exemplary materials are polypropylene (microwave only) and dual use CPET (crystalline polyethylene terephthalate) available from a number of manufacturers. CPET is particularly suitable due to its wide temperature tolerance. The trays 10, 12 may be transparent or opaque.

Figure 3:
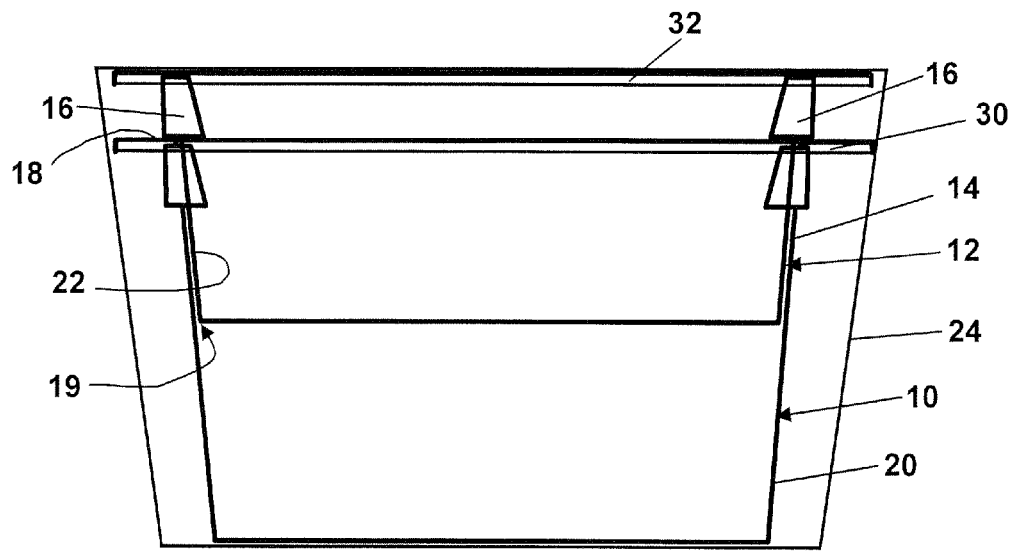
FIG. 3 shows the food tray of FIG. 1 with a cover.

As shown in FIG. 3, the food tray is preferably provided with a cover 24, such as a sleeve. The sleeve may be a paperboard sleeve into which the combined trays 10 and 12 are inserted. The cover 24 could also be a carton that encloses both trays 10 and 12 completely.

Figure 4:
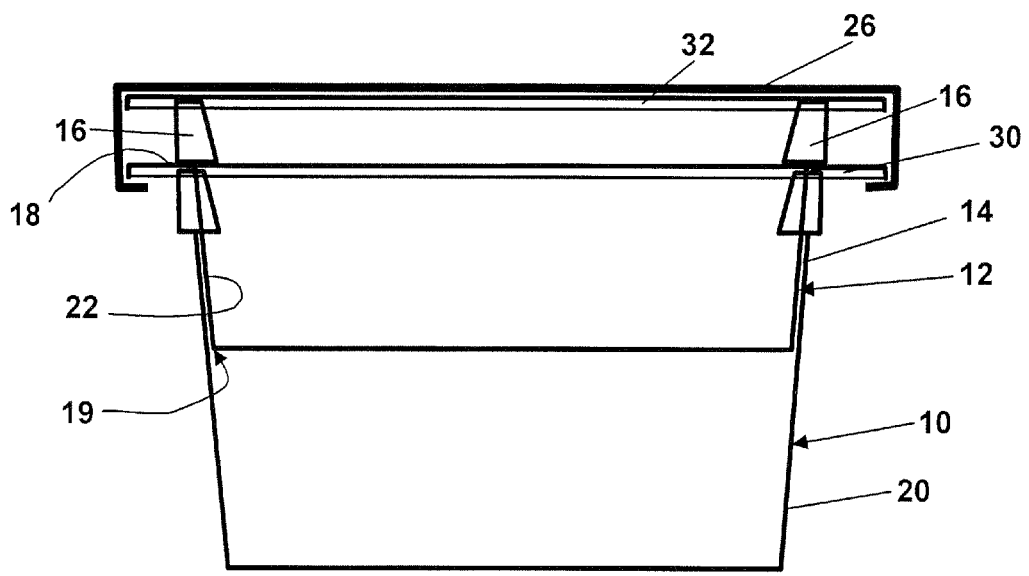
FIG. 4 shows an embodiment of a food tray with a snap-on cover.
Figure 8:
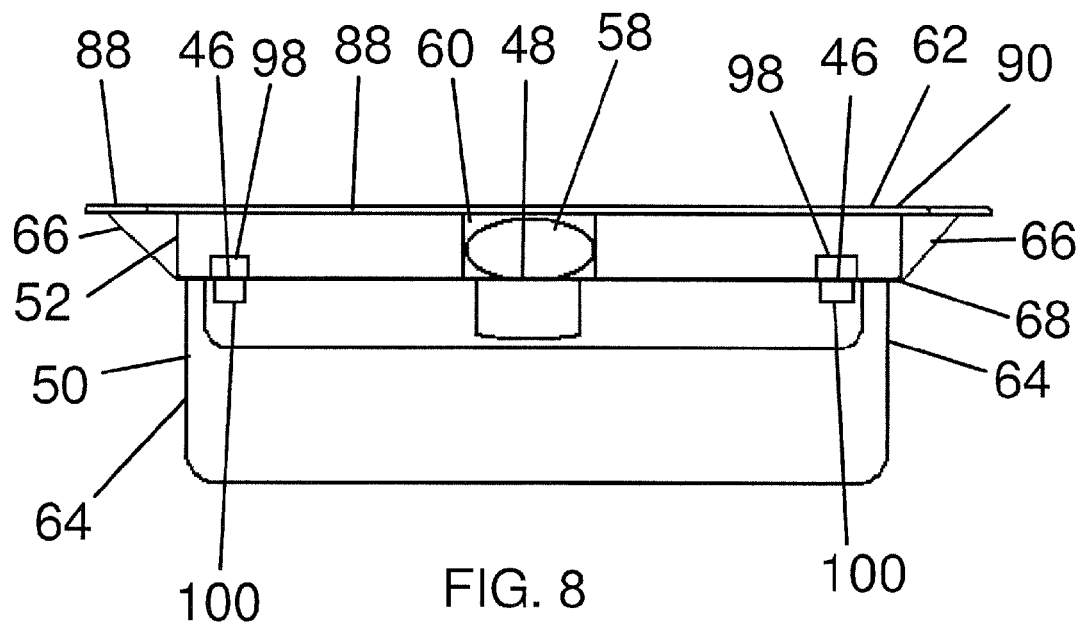
FIG. 8 is a side view of a further embodiment of a food tray comprising an upper tray and lower tray.

As shown in FIG. 4, the cover may comprise a snap-oil microwavable lid 26 for the upper tray 12. The lid 26 may extend over the lip 20 on the lower tray 10. The cover 24 may also include a film that is heat sealed to the lip 32 on the upper tray 12. The film may be on the underside of a cardboard sleeve, or a stand alone cover heat sealed to the lip 32.

As shown in FIG. 4, the air permeable interface may be formed by a seat created by lugs or ledges 28 formed in the sidewalls 20 of the lower tray 10 and spaced around the periphery of the lower tray 10, with the upper tray 12 resting directly on the lugs or ledges 28. Preferably, the lugs or ledges 28 are discontinuous or provided with openings to allow the escape of steam during cooking. As shown in FIG. 6, the air permeable interface may be formed by the lip 32 resting directly on the upper edge 18 of the lower tray 10. In this case, as shown in FIG. 7, the lip 32 is preferably provided with protrusions 34 for allowing steam release. In each of these cases, it is preferable that the air permeable interface supports the upper tray 12 in the lower tray 10 so that the lip 32 of the upper tray 12 sits above the lower tray 10. In the example of FIG. 7, the outwardly extending lip 32 of the upper tray 12 sits loosely on the upper edge 18 of the lower tray 10 to form the air permeable interface with a gap 29 between the side walls 22 of the upper tray 12 and the sidewalls 20 of the lower tray 10. The upper tray 12 and lower tray 10 may also have fluted sides to allow venting of steam during cooking. In another embodiment, the upper tray 12 may sit entirely within the lower tray 10 on lugs or ledges, with a handle provided on the upper tray 12 to allow the upper tray 12 to be easily removed from the lower tray 10.

Food is placed in each of the upper tray 12 and lower tray 10. The food product 42 in the upper tray 12 may be a higher value food product in terms of cost per weight than the food product 40 in the lower tray 10. Thus the lower tray 10 may include pasta, rice or vegetable, which is usually the higher volume product. The upper tray 12 may include a sauce, such as cheese sauce, meat or seafood sauce, or vegetable sauce. Water may be added to the lower tray 10 to assist in cooking the food product in the lower tray 10. Preferably, a gap 44 is provided between the top of the food product 40 and the bottom 45 of the upper food tray 12 to avoid the food product 40 coming into contact with the bottom 45 of the upper food tray.

In another embodiment, chili may be placed in the lower tray 10 and a biscuit in the upper tray 12. For food product such as a biscuit that should have a crisp exterior texture when cooked, a susceptor board may be placed in the tray with the food product.

When sold, the food tray, including food, may be wrapped in shrink wrap. For use, the customer removes the shrink wrap and deposits the food tray in an oven (conventional or microwave as appropriate for the materials), where the food tray is subject to food heating energy. If the upper tray 12 is sealed with a film, it may be removed or loosened prior to cooking depending on the cooking instructions. Due to the air permeable interface 14, the food tray permits steam to escape from the lower tray. Upon removal of the food tray from the oven, the higher value food product may be added to the lower value food product, simply by pouring the higher value food product into the lower tray. Due to the product being in separate trays, quicker more even heating is obtained. With the higher value product in the top tray, the aromas of the higher value product are easily available to the customer upon heating, and the higher value product also presents a pleasing aspect to the customer.

Either or both the cover 24 or the sidewalls 20, 22 may be provided with graphics illustrating the food product and providing instructions for use.

Figure 9:
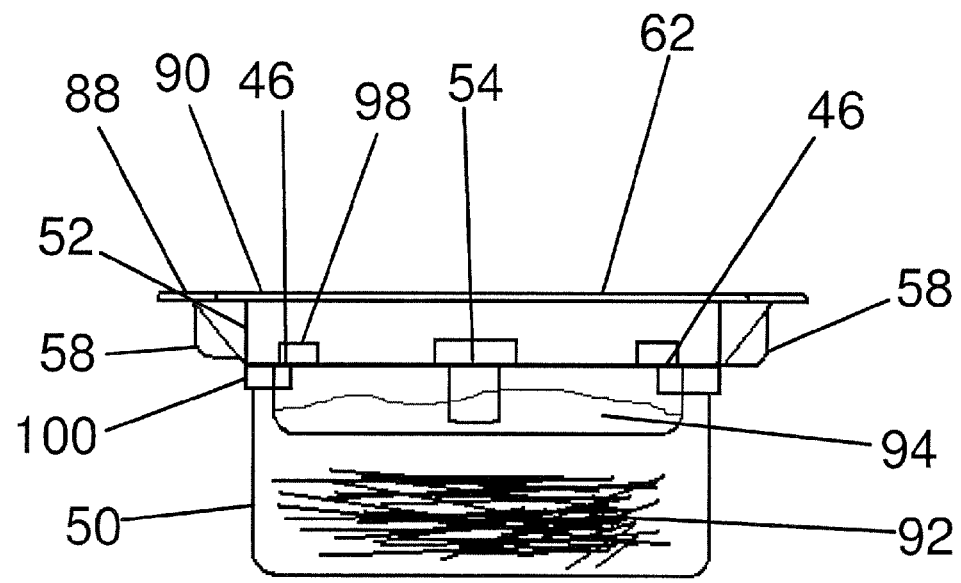
FIG. 9 is a side view of the food tray of FIG. 8 at right angles to the view of FIG. 8 with food product in the upper and lower trays.
Figure 10:
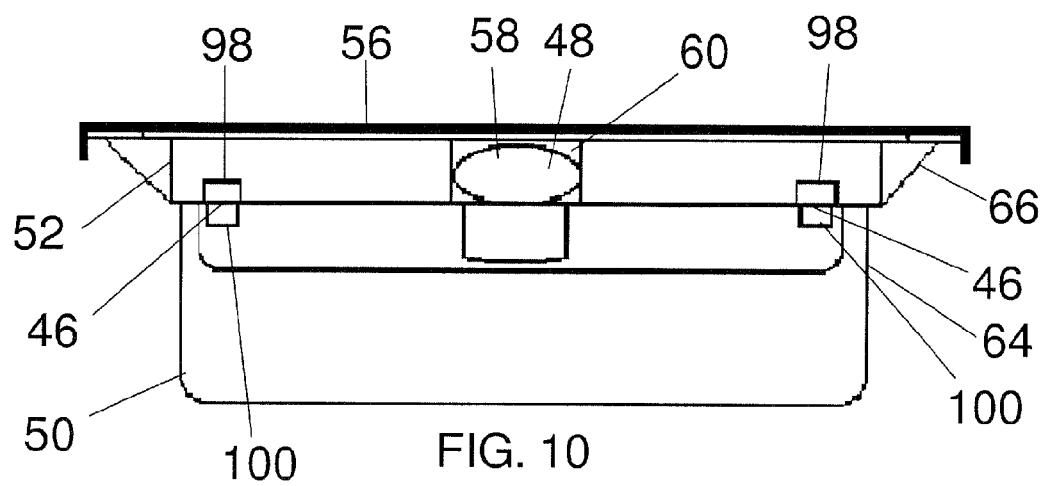
FIG. 10 shows the food tray of FIG. 8 with a cover.
Figure 19:
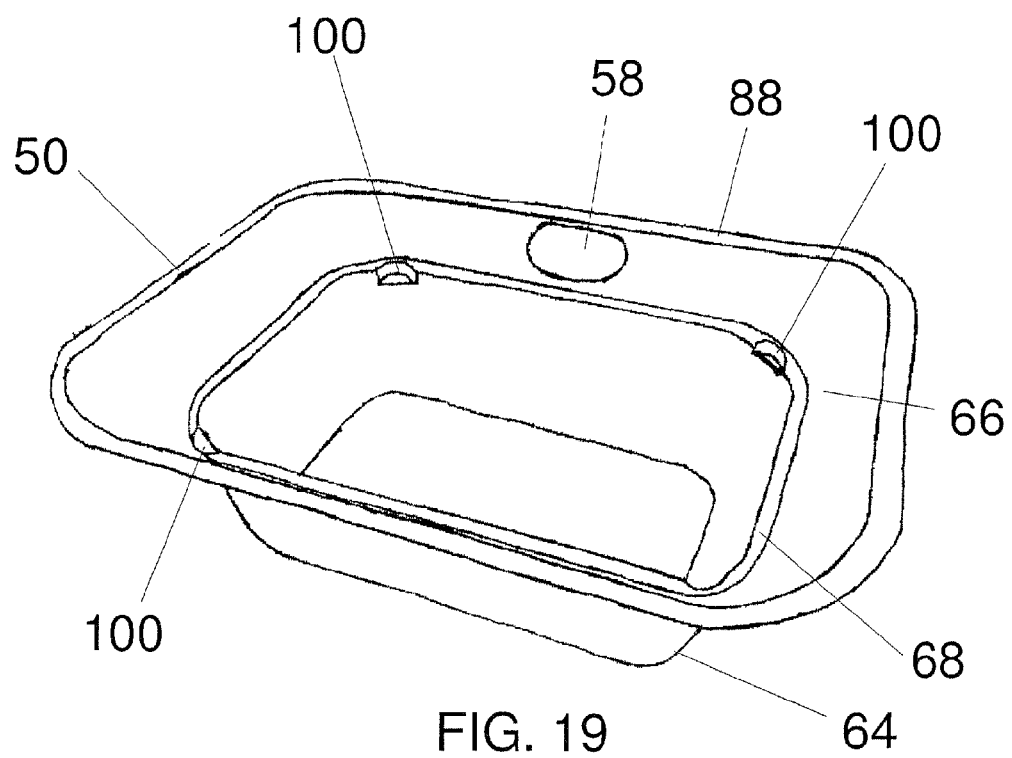
FIG. 19 is a perspective drawing of the lower tray of FIG. 8.
Figure 20:
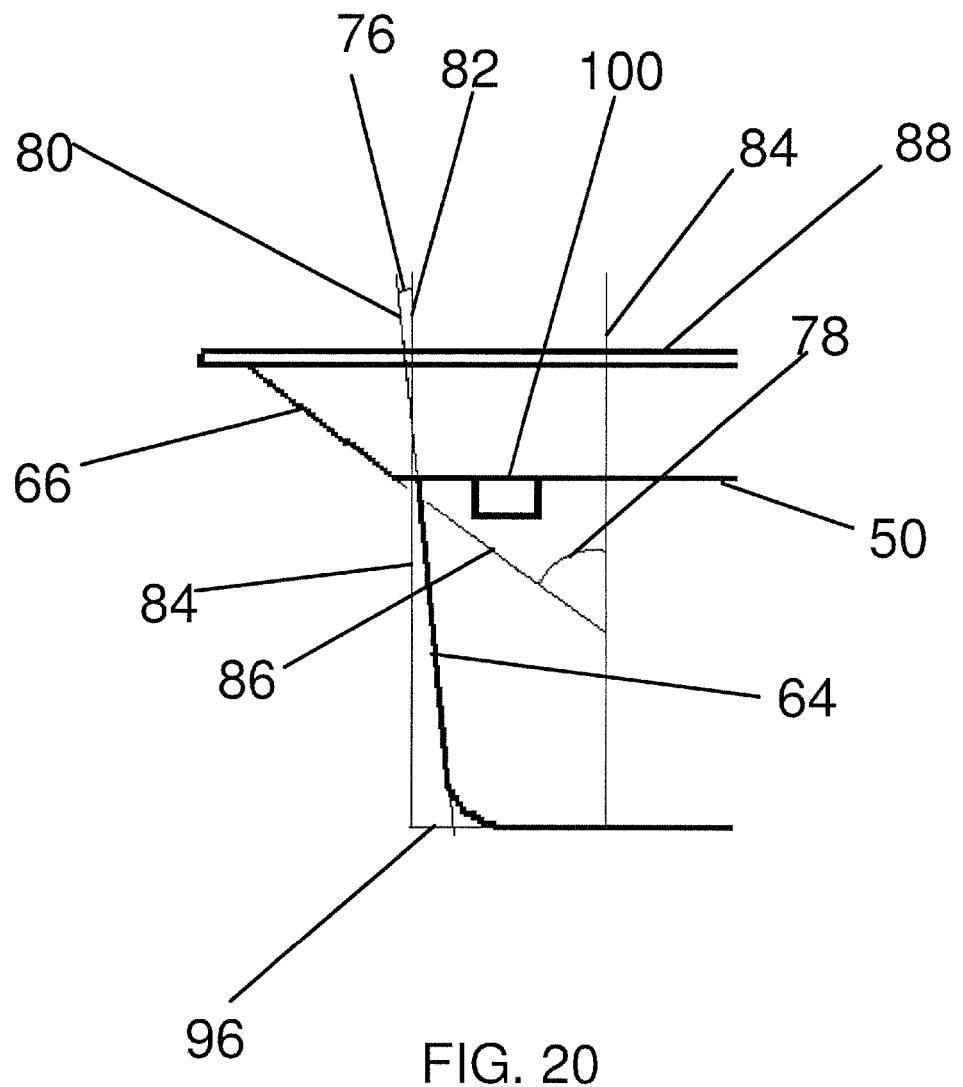
FIG. 20 shows a section through the food tray of FIG. 8 illustrating angles of side walls of the upper tray.

As shown in FIGS. 8-20, a further embodiment of a food tray is formed from a lower tray 50 and an upper tray 52. FIG. 10 shows the food tray with a cover 56. The cover 56 may be any suitable cover such as a heat-sealed shrinkwrap, or a plastic snap-on lid, suitable for microwave use. In FIGS. 8-17, the lower tray 50 is shown as having side walls perpendicular to the base of the tray, but this is for illustrative purposes only, and its side walls may be angled outward as shown in FIGS. 19 and 20. Likewise, the side walls of the upper tray 52 may be angle outward and may extend parallel to the upper side wall 66 shown in FIG. 19. FIG. 9 shows a first food product 92 in the lower tray 50, and a second food product in the upper tray 52.

Various air channels 46, 48 and 54 form an air permeable interface between the upper tray 52 and lower tray 50. The upper tray 52 has a downward facing shoulder 70 extending around the upper tray 52, which sits on a corresponding upward facing shoulder 68 extending around the lower tray 50. The shoulder 70 is not continuous, but is interrupted by parts forming the air channels 46, 48 and 54. Air channels 46 are formed from several indents 98 in the sidewall of the upper tray 52 that extend part of the way across the shoulder 70, the indents 98 cooperating with indents 100 formed in the sidewall of the lower tray 50. The indents 98 form cavities that open downward, while the indents 100 form cavities that open upward. The cooperating indents 98 and 100 together form air channels 46.

Air channels 48 are formed from indents 58 and 60 in the lower tray 50 and upper tray 52 respectively. The indents 58 are formed in slanting upper sidewalls of the lower tray 58, and open upward. The indents 60 are sized to receive a person's finger, and open outward from the wall of the upper tray 52. The indents 58 and 60 cooperate to form the air channels 48. In addition, the indents 58 and 60, as well as the lip 62 of the upper tray 52, allow for easy removal of the upper tray 52 from the lower tray 50. This ease of removal is more specifically facilitated by the dome shape of the indent 58 on the lower tray 50, and the shape of the indent 60 on the upper tray 52, which are shaped to receive a person's finger.

Figure 11:
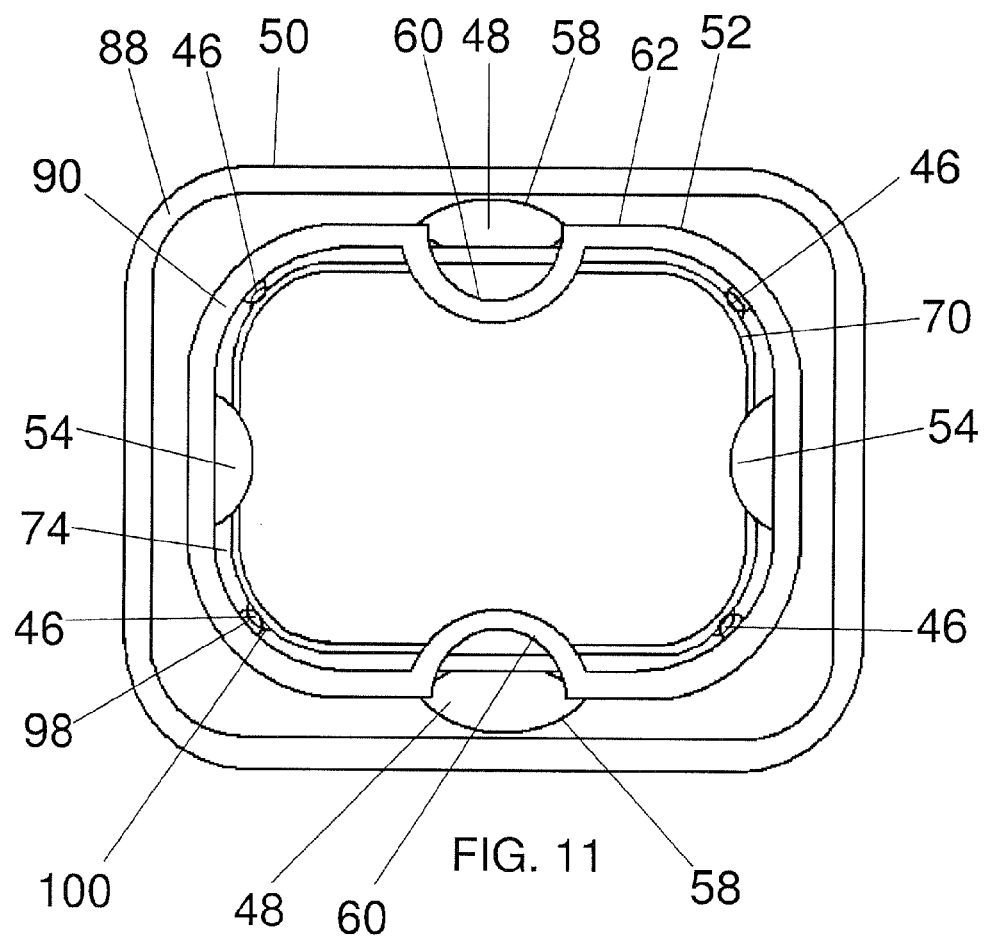
FIG. 11 is a top view of the food tray of FIG. 8.
Figure 12:
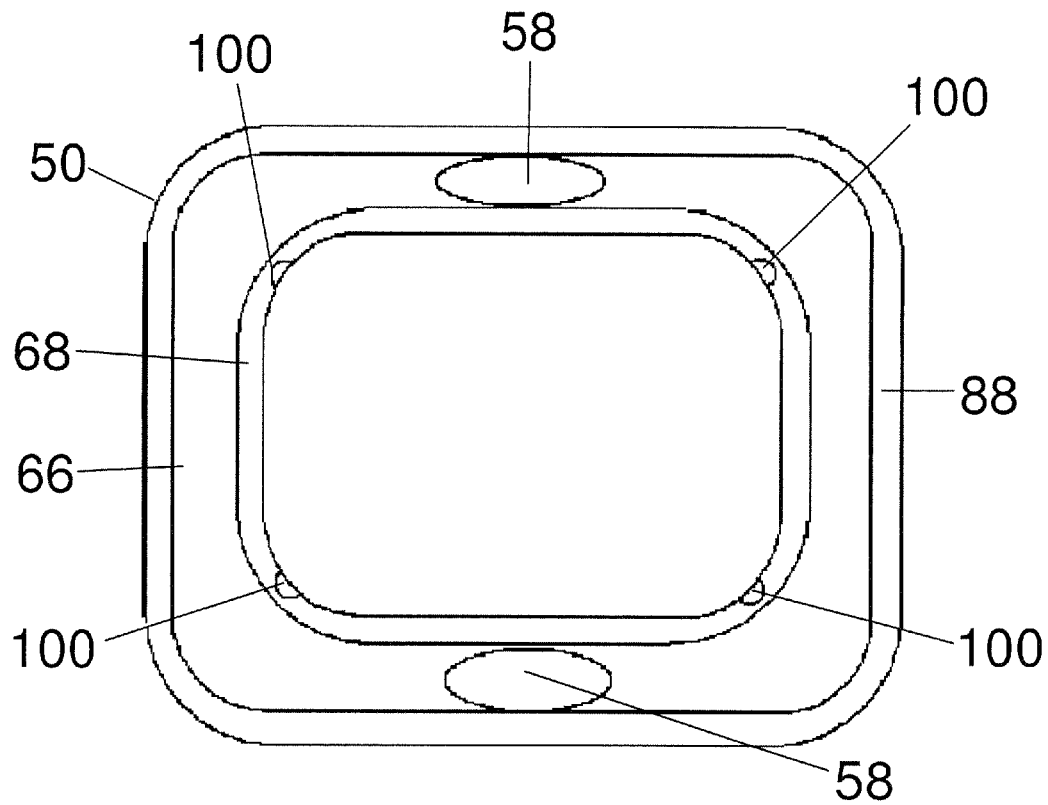
FIG. 12 is a top view of the lower tray of FIG. 8.
Figure 13:
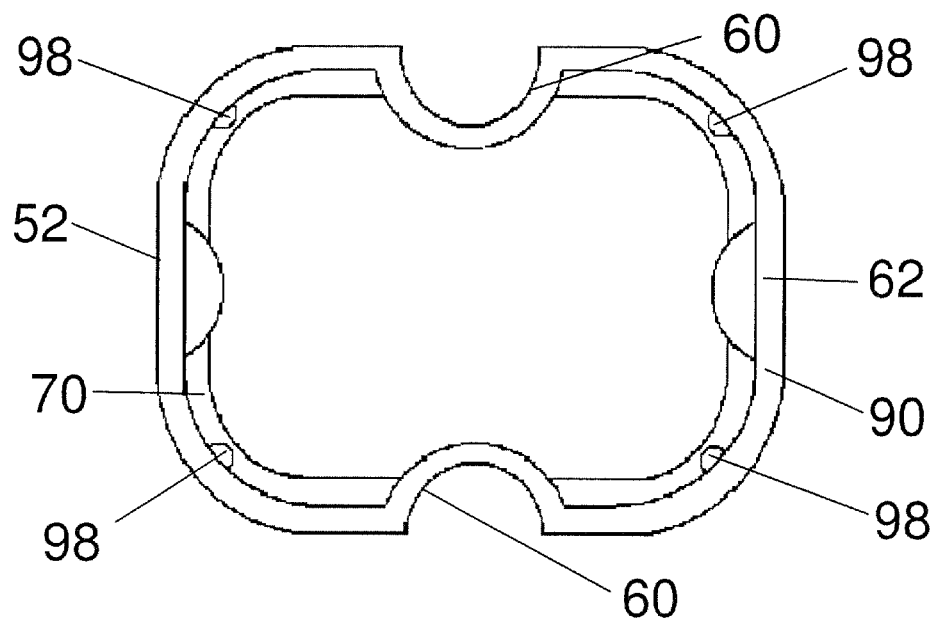
FIG. 13 is a top view of the upper tray of FIG. 8.
Figure 14:
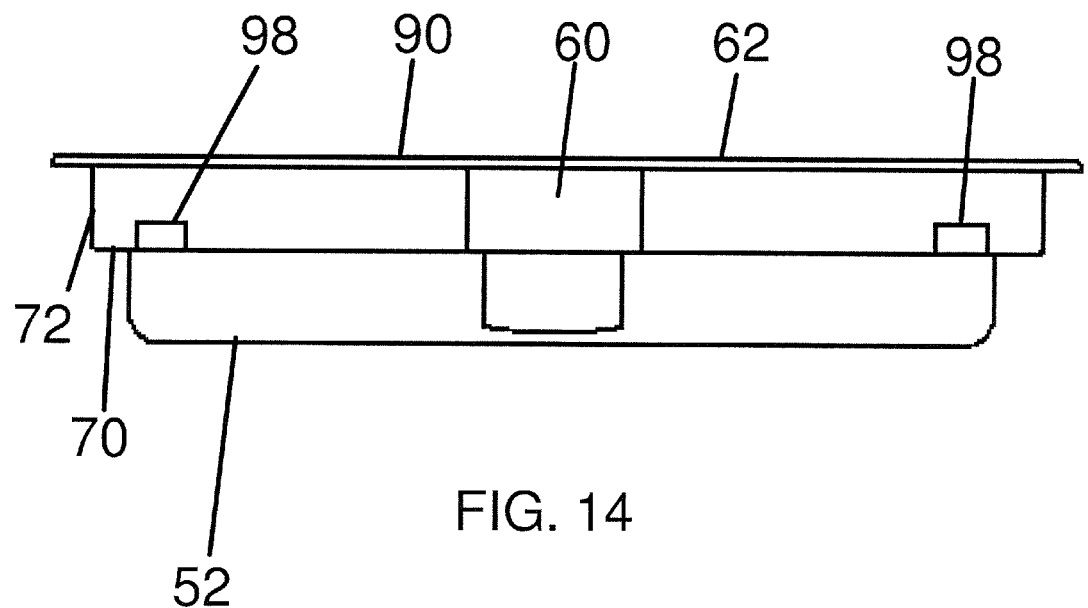
FIG. 14 is a section through the upper tray of FIG. 8.
Figure 15:
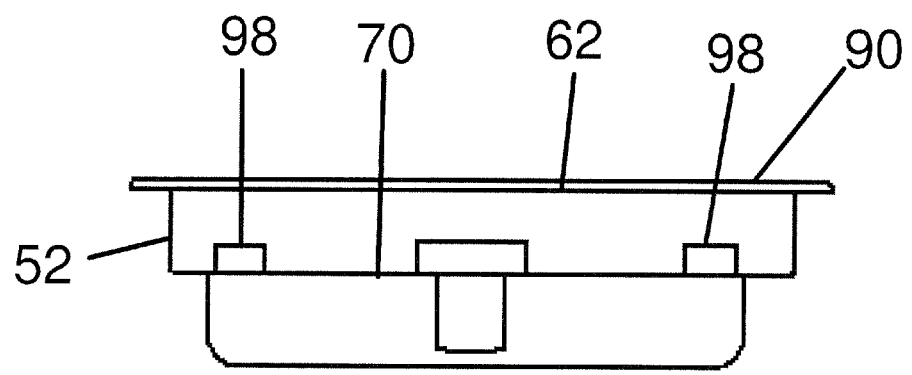
FIG. 15 is another section through the upper tray of FIG. 8.
Figure 16:
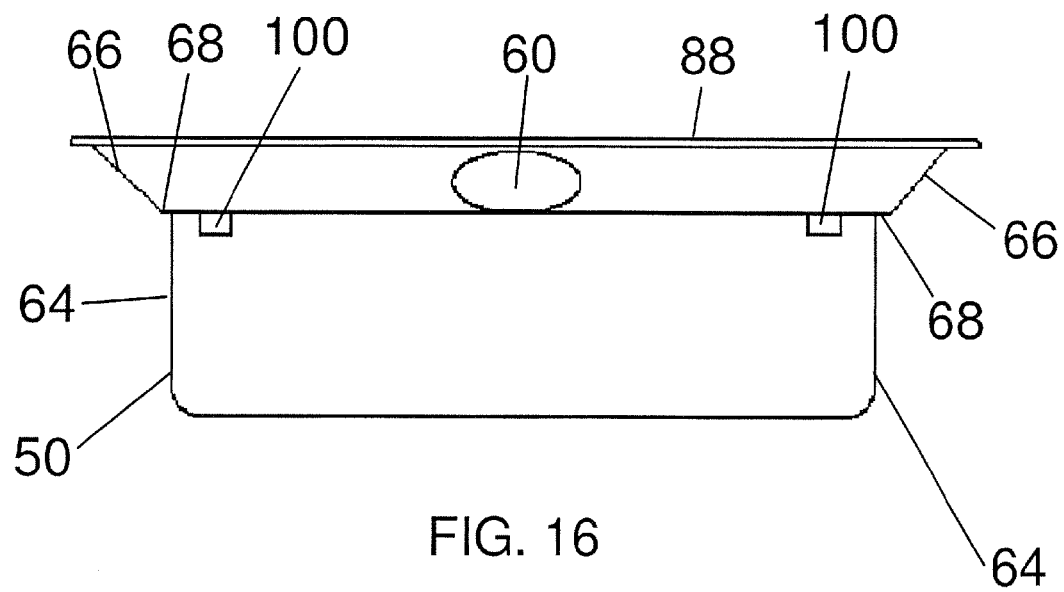
FIG. 16 is a section through the lower tray of FIG. 8.
Figure 17:
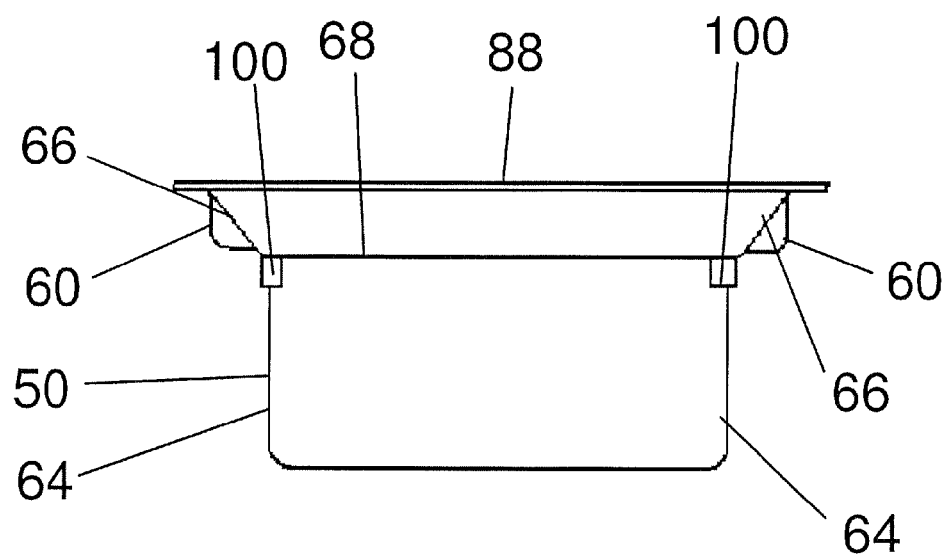
FIG. 17 is another section through the lower tray of FIG. 8.
Figure 18:
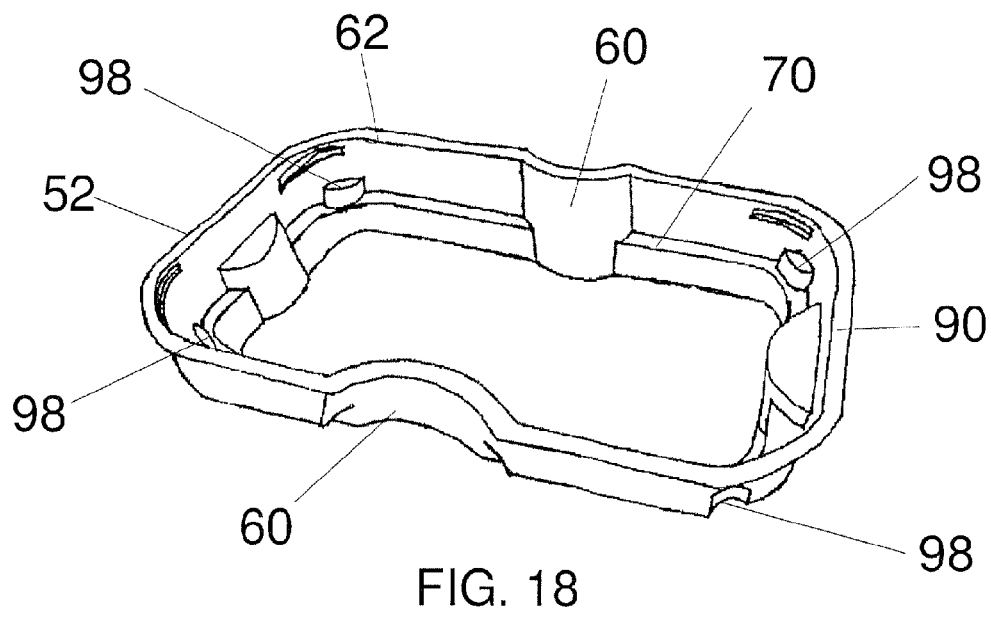
FIG. 18 is a perspective drawing of the upper tray of FIG. 8.

The lower tray 50 has a side wall formed of a lower peripheral wall 64 and upper peripheral wall 66 connected by shoulder 68, upon which the upper shoulder 70 of the upper tray 52 stably rests. The upper shoulder 70 of the upper tray 52 is attached to the peripheral wall 72 of the upper tray 52. The lower shoulder 68 is attached to the upper peripheral wall 66 of the lower tray 50. FIG. 11 shows the contact area 74 between the upper shoulder 70 and the lower shoulder 68 of the upper tray 52 and lower tray 50 respectively FIG. 20 illustrates the outward slant of upper and lower parts of the side wall of the lower tray 50. Normals 82 and 84 are drawn perpendicular to the plane 96 created by the bottom of the lower tray 50. A projection 86 of the upper peripheral wall 66 of the lower tray 50 intersects line 84 at an angle 78. A projection 80 of the lower peripheral wall 64 of the lower tray 50 intersects line 82 at an angle 76 that is smaller than angle 78. Various angles may be selected for the angles 76 and 78.

Each of the lower tray 50 and the upper tray 52 have upper edges forming a flange or lip, that is preferably at least a few millimeters wide to accommodate sealing of the top to a cover. The top flange or lip 88 of the lower tray 50 and the top flange or lip 90 of the upper tray 52 may be level with each other when the product is assembled. This allows both trays to be simultaneously sealed. This may be done with shrinkwrap or a plastic cover.

Immaterial modifications may be made to the embodiments described here without departing from what is claimed.

What is claimed is:

1. A food tray, comprising:
   a lower tray containing a first food product, the lower tray having a lower peripheral wall with an upward facing shoulder extending around the lower peripheral wall;
   an upper tray containing a second food product, the upper tray having a rim and a lower peripheral wall extending downward from the rim, the lower peripheral wall providing a downward facing shoulder extending around the lower peripheral wall and spaced apart from the rim so that the downward facing shoulder rests on the upward facing shoulder when the upper tray is nested in the lower tray, the downward facing shoulder being discontinuous;
   a first indent in a first side of the lower tray;
   a first indent in a first side of the upper tray, the first indent of the upper tray positioned over the first indent of the lower tray when the upper tray is nested within the lower tray;
   a second indent in a second side of the lower tray, the second side of the lower tray being located opposite the first side of the lower tray;
   a second indent in a second side of the upper tray, the second side of the upper tray being located opposite the first side of the upper tray, the second indent of the upper tray positioned over the second indent of the lower tray when the upper tray is nested within the lower tray;
   a third indent in a third side of the upper tray;
   a fourth indent in a fourth side of the upper tray, the fourth side located opposite the third side, the third and fourth indents of the upper tray providing first and second air channels respectively for facilitating venting of steam from the lower tray and to facilitate removal of the upper tray from the lower tray;
   a fifth indent in the upper tray, the fifth indent of the upper tray being formed by the discontinuous downward facing shoulder of the upper tray and being formed between the first and third indents of the upper tray;
   a third indent in the lower tray, the fifth indent of the upper tray being positioned over the third indent of the lower tray when the upper tray is nested within the lower tray, wherein the first, second and third indents of the lower tray are configured to cooperate with the first, second and fifth indents of the upper tray, respectively, to provide third, fourth and fifth air channels for facilitating venting of steam from the lower tray and to facilitate removal of the upper tray from the lower tray.

2. The food tray of claim 1, wherein the lower tray comprises a base, and the lower peripheral wall of the lower tray is formed in upper and lower parts, the upper part angling outward at a greater angle with respect to the base than the lower part.

3. The food tray of claim 1, wherein the upper tray and lower tray each have upper edges that terminate upwardly at the same level.

4. The food tray of claim 1, wherein the lower tray comprises a first upper edge forming a first flange and the upper tray comprises a second upper edge forming a second flange, and a cover is sealed to the first flange and the second flange when the upper tray is nested in the lower tray.

5. A food tray, comprising:
   a lower tray containing a first food product and having a first peripheral wall;
   an upper tray nested at least partly inside the lower tray, the upper tray containing a second food product and having a second peripheral wall;
   a first indent in a first side of the lower tray;
   a first indent in a first side of the upper tray, the first indent of the upper tray positioned over the first indent of the lower tray when the upper tray is nested within the lower tray;
   a second indent in a second side of the lower tray, the second side of the lower tray located opposite the first side;
   a second indent in a second side of the upper tray, the second side of the upper tray located opposite the first side, the second indent of the upper tray positioned over the second indent of the lower tray when the upper tray is nested within the lower tray;
   the first and second indents of the lower tray configured to cooperate with the first and second indents of the upper tray, respectively, to provide air channels for venting the lower tray and to facilitate removal of the upper tray from the lower tray;
   the lower tray having a first base and a first rim, the first peripheral wall of the lower tray formed in upper and lower parts, the upper part angling outward at a greater angle with respect to the base than the lower part to define an upward facing shoulder extending around the first peripheral wall between the upper part and the lower part so that the upward facing shoulder is spaced apart from the first rim; and the upper tray having a second base and a second rim, the second peripheral wall of the upper tray formed in upper and lower parts, the upper part angling outward at a greater angle with respect to the base than the lower part to define a downward facing shoulder extending around the first peripheral wall and spaced apart from the second rim so that the downward facing shoulder rests on the upward facing shoulder when the upper tray is nested in the lower tray.

6. The food tray of claim 5, wherein the top of the lower tray is level with the top of the upper tray.

7. The food tray of claim 5, wherein the lower tray comprises a first upper edge forming a first flange and the upper tray comprises a second upper edge forming a second flange, and a cover is sealed to the first flange and the second flange when the upper tray is nested in the lower tray.

\* \* \* \* \*